(12) United States Patent
Nelson et al.

(10) Patent No.: US 11,204,920 B2
(45) Date of Patent: Dec. 21, 2021

(54) UTILIZING SEARCH ENGINE RELEVANCY RANKING MODELS TO GENERATE NORMALIZED AND COMPARABLE SEARCH ENGINE SCORES

(71) Applicant: Accenture Global Solutions Limited, Dublin (IE)

(72) Inventors: Paul Edward Nelson, Annapolis, MD (US); Mark David, Campbell, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/947,686

(22) Filed: Aug. 12, 2020

(65) Prior Publication Data

US 2021/0073225 A1    Mar. 11, 2021

Related U.S. Application Data

(60) Provisional application No. 62/897,672, filed on Sep. 9, 2019.

(51) Int. Cl.
*G06F 16/2453*  (2019.01)
*G06F 16/9535*  (2019.01)
*G06F 16/9538*  (2019.01)
*G06F 16/2457*  (2019.01)
*G06F 16/951*   (2019.01)

(52) U.S. Cl.
CPC .. *G06F 16/24537* (2019.01); *G06F 16/24578* (2019.01); *G06F 16/951* (2019.01); *G06F 16/9535* (2019.01); *G06F 16/9538* (2019.01)

(58) Field of Classification Search
CPC ........... G06F 16/24537; G06F 16/9535; G06F 16/24578; G06F 16/951; G06F 16/9538
See application file for complete search history.

(56) References Cited

U.S. PATENT DOCUMENTS

| 2017/0228425 A1* | 8/2017 | Kandula ................ G06N 7/005 |
| 2020/0065420 A1* | 2/2020 | Scodary .............. G06F 16/9535 |
| 2021/0158192 A1* | 5/2021 | Chen ..................... G06N 5/045 |

OTHER PUBLICATIONS

Breitinger et al., "Research-paper recommender systems: a literature survey". International Journal on Digital Libraries. 17 (4): 305-338. doi:10.1007/s00799-015-0156-0. ISSN 1432-5012. "TF-IDF was the most frequently applied weighting scheme" Jul. 26, 2015, 70 Pages.

(Continued)

*Primary Examiner* — Kris E Mackes
(74) *Attorney, Agent, or Firm* — Harrity & Harrity, LLP

(57) ABSTRACT

A device may receive a user-specified query, and may construct the user-specified query as a query tree of operators that include zero or more operands. The device may produce, for each of the operators, a weight that indicates how valuable or confident a determination of relevancy of each of the operators is in relation to siblings in the query tree. The device may normalize the weights for the siblings in the query tree with a parent operator according to a normalization formula. The device may produce, for each of the operators, a score, normalized to a value from zero to one and computed for the document, that represents how relevant the document is to the user-specified query. The device may apply the query tree to the document as a whole as well as to positions within the document to determine the final normalized score for the document.

20 Claims, 12 Drawing Sheets

(56) References Cited

OTHER PUBLICATIONS

Elasticsearch BV, "Elastic Reaches 100 Million Downloads for the Elastic Stack" [Press Release] Retrieved from https://www.elastic.co/about/press/elastic-reaches-100-million-downloads-for-the-elastic-stack, Mar. 7, 2017, 3 Pages.
Sparck Jones, K., "A Statistical Interpretation of Term Specificity and Its Application in Retrieval". Journal of Documentation. 28: 11-21. CiteSeerX 10.1.1.115.8343 doi:10.1108/eb026526, 1972, 9 Pages.
Salton et al., "A vector space model for automatic indexing". Communications of the ACM. 18 (11): 613. doi:10.1145/361219.361220 hdl:1813/6057, 1975, 32 Pages.
Apache Software Foundation, "org.apache.lucene.search.similarities. TFIDFSimilarity" Apache Lucene Documentation. Version 7.4. Retrieved from https://lucene.apache.org/core/7_4_0/core/org/apache/lucene/search/similarities/TFIDFSimilarity.html, Jun. 22, 2018, 11 Pages.
Robertson et al., "Okapi at TREC-3". Proceedings of the Third Text REtrieval Conference (TREC 1994). Gaithersburg, USA, Nov. 1994, 19 Pages.
S. Robertson, "Understanding inverse document frequency: On theoretical arguments for IDF". Journal of Documentation. 60 (5): 503-520. doi:10.1108/00220410410560582, 2004, 20 Pages.
Apache Software Foundation, "org.apache.lucene. search. BooleanWeight" (source code), version 8.2. Apache Lucene Source Code. Downloaded from https://www.apache.org/dyn/closer.lua/lucene/java/8.2.0/lucene-8.2.0-src.tgz, Jul. 25, 2019, 10 Pages.
Apache Software Foundation, "Configuring statsCache (Distributed IDF) ". Solr Reference Guide, Version 6.6. Retrieved from https://lucene.apache.org/solr/guide/6_6/distributed-requests.html, Jun. 19, 2017, 6 Pages.
Elasticsearch BV, "Request Body Search", section "Dfs, Query Then Fetch". Elasticsearch Reference [7.3]. Retrieved from https://www.elastic.co/guide/en/elasticsearch/reference/7.3/search-request-body.html#dfs-query-then-fetch Aug. 12, 2020, 67 Pages.
Google Search, "taylor swift" Google Web Search. https://www.google.com/search?q=taylor+swift, Sep. 1, 2019, 3 Pages.
Google Search, "beyoncé" Google Web Search. https://www.google.com/search?q=beyoncé, Sep. 1, 2019, 3 Pages.
Paul E. Nelson, "The Excalibur TREC-4 System, Preparations, and Results" Proceedings of the Fourth Text Retrieval Conference, Retrieved from https://web.archive.org/web/20101127044439/http://pnelsoncomposer.com/writings/excalibur-trec4.pdf, 1995, 10 Pages.
Apache Software Foundation, "Other Parsers ". Solr Reference Guide, Version 6.6. Retrieved from https://lucene.apache.org/solr/guide/6_6/other-parsers.html, Jun. 19, 2017, 22 Pages.
Reuters, The Reuters-21578, Dataset Distribution 1.0. Retrieved from http://kdd.ics.uci.edu/databases/reuters21578/reuters21578.html, Feb. 16, 1999, 13 Pages.
Massachusetts Institute of Technology, "Normalizing Census Data". A Workshop on Geographic Information Systems. Retrieved from http://web.mit.edu/11.520/www/labs/lab5/normalize.html, Oct. 1, 2002, 2 Pages.
Apache Software Foundation, "Remove queryNorm and cords". Apache's JIRA issue tracker. Retrieved from https://issues.apache.org/jira/browse/LUCENE-7347, Jul. 12, 2016, 1 Page.
Apache Software Foundation, "org.apache.lucene.search.similarities. Similarity" Apache Lucene Documentation. Version 7.4. Retrieved from https://lucene.apache.org/core/5_0_0/core/org/apache/lucene/search/similarities/Similarity.html#queryNorm(float), Feb. 20, 2016, 3 Pages.
University of Denver, "Multiple Risk Factors". International Futures Help System. Retrieved from https://www.du.edu/ifs/help/understand/health/proximate/multiple.html, 2019, 2 Pages.
National Center for O*NET Development. O*NET OnLine, https://www.onetonline.org/, Retrieved Sep. 1, 2019, 1 Page.
Wikipedia contributors, Jaccard index. In Wikipedia, The Free Encyclopedia. Retrieved 15:53, Sep. 1, 2019, from https://en.wikipedia.org/w/index.php?title=Jaccard_index&oldid=905462536, Jul. 9, 2019, 8 Pages.
Apache Software Foundation, "org.apache.lucene.search.similarities. Similarity" Apache Lucene Documentation. Version 7.4. Retrieved from https://lucene.apache.org/core/7_4_0/core/org/apache/lucene/search/similarities/ClassicSimilarity.html#sloppyFreq-int-, Jun. 22, 2018, 4 Pages.

\* cited by examiner

UTILIZING SEARCH ENGINE RELEVANCY RANKING MODELS TO GENERATE NORMALIZED AND COMPARABLE SEARCH ENGINE SCORES

RELATED APPLICATION

This application claims priority to U.S. Provisional Patent Application No. 62/897,672, filed on Sep. 9, 2019 and entitled "UTILIZING SEARCH ENGINE RELEVANCY RANKING MODELS TO GENERATE NORMALIZED AND COMPARABLE SEARCH ENGINE SCORES," the content of which is incorporated by reference herein in its entirety.

BACKGROUND

A numerical score produced for documents as a query result by most search engines is a non-normalized score that varies from query to query, from search engine to search engine, and from dataset to dataset. For example, indexing a simple database of 1000 news articles from the 1980s with a popular search engine can produce wildly different scores. A search on the term "stock" from this dataset returns scores from 1.793 (best) to 0.360 (worst). A search on the term "chemlawn waste management" returns scores which range from 10.660 to 0.458. These implementations have only been concerned with ordering search results from a single query and have not been concerned with comparability or normalization of scores (across searches, fields, or datasets).

Much of the problem comes down to the ubiquitous use of the term frequency-inverse document frequency (TF-IDF) scoring metric as a direct, non-normalized input to scoring functions. The scoring metric may be different for different search engines. For example, one search engine utilizes the following metric:

$$TF\_IDF = \sqrt{tf} \cdot \left(1 + \log\left(\frac{N+1}{df+1}\right)\right)^2$$

where a term frequency (tf) may correspond to a count of occurrences of a term in a document, a document frequency (df) may correspond to a count of documents which contain the term, and N may correspond to a total number of documents in an index. A variation of the scoring metric may include weighting for document length (e.g., adjusted below to ensure that IDF is always greater than zero) as follows:

$$\frac{tf \cdot (k1+1)}{tf + k1 * \left(1 - b + b\frac{dl}{adl}\right)} \cdot \ln\left(1 + \frac{N - df + 0.5}{df + 0.5}\right),$$

where a document length (dl) is measured by a count of tokens, an average document length (adl) across all documents may correspond to an average number of tokens per document, and k1 and b may correspond to constants which default to values (e.g., 1.2 and 0.75, respectively).

One way to solve for TF-IDF problems is to depend more on the positional information within the document, e.g. exactly where in a document matching words and concepts are located and their physical relationship to each other within the document. However, this is rarely done, and when it is, it is not done using methods which produce normalized (e.g. percentage) scores or which preserve the semantic structure of the query request.

Finally, an additional challenge with standard TF-IDF algorithms is that they lack two key structural elements to truly model user intent and produce normalized relevancy scores. The first is semantic structure, how words and concepts within the query are related to each other and how their presence absence in the document is interrelated. The second is a notion of confidence, that is, how much a word or phrase within the document increases the confidence of the overall score, especially when compared to the other words and phrases in the query expression. The lack of semantic structure and a rigorous confidence weighting framework (in addition to proximity analysis) in current algorithms limits their ability to produce reliable, normalized relevancy scores.

SUMMARY

According to some implementations, a method may include receiving, from a client device, a user-specified query, and constructing the user-specified query as a query tree of operators that include zero or more operands that represent a semantic structure of the user-specified query. The method may include producing, for each of the operators, a weight that indicates how valuable or confident a determination of relevancy of each of the operators is in relation to siblings in the query tree, wherein the weight is computed from metrics that are independent of documents in an index. The method may include normalizing weights for the siblings in the query tree inside a parent operator according to a normalization formula. The method may include producing, for each of the operators, a score, normalized to a value from zero to one and computed for the document, that represents how relevant the document is to the user-specified query, wherein the score is computed by each of the operators based on information available from children of each of the operators and from a search engine index. The method may include determining a normalized score indicating how relevant the document is to the user-specified query based on applying the query tree to the document as a whole as well as to positions within the document, and performing one or more actions based on the score.

According to some implementations, a device may include one or more memories and one or more processors to receive, from a client device, a user-specified query, and construct the user-specified query as a query tree of operators that include zero or more operands that represents the semantic structure of the user-specified query. The one or more processors may produce, for each of the operators, a weight that indicates how valuable or confident a determination of relevancy of each of the operators is in relation to siblings in the query tree, wherein the weight is computed from metrics that are independent of a document. The one or more processors may normalize confidence weights for the siblings in the query tree inside a parent operator according to a normalization formula. The one or more processors may produce, for each of the operators, a score, normalized to a value from zero to one and computed for the document, that represents how relevant the document is to the user-specified query, wherein the score is computed by each of the operators based on information available from children of each of the operators and from a search engine index. The one or more processors may determine a normalized score indicating how relevant the document is to the user-specified query based on applying the query tree to the document as a whole as well as to positions within the document, and may perform one or more actions based on the score.

According to some implementations, a non-transitory computer-readable medium may store one or more instructions that, when executed by one or more processors of a device, may cause the one or more processors to receive, from a client device, a user-specified query, and construct the user-specified query as a query tree of operators that include zero or more operands that represents the semantic structure of the user-specified query. The one or more instructions may cause the one or more processors to produce, for each of the operators, a weight that indicates how valuable or confident a determination of relevancy of each of the operators is in relation to siblings in the query tree, wherein the weight is computed from metrics that are independent of a document. The one or more instructions may cause the one or more processors to normalize weights for the siblings in the query tree inside a parent operator according to a normalization formula. The one or more instructions may cause the one or more processors to produce, for each of the operators, a score, normalized to a value from zero to one and computed for the document, that represents how relevant the document is to the user-specified query, wherein the score is computed by each of the operators based on information available from children of each of the operators and from a search engine index. The one or more instructions may cause the one or more processors to determine a normalized score indicating how relevant the document is to the user-specified query based on applying the query tree to the document as a whole as well as to positions within the document, and perform one or more actions based on the score.

DETAILED DESCRIPTION

Figure 1A:
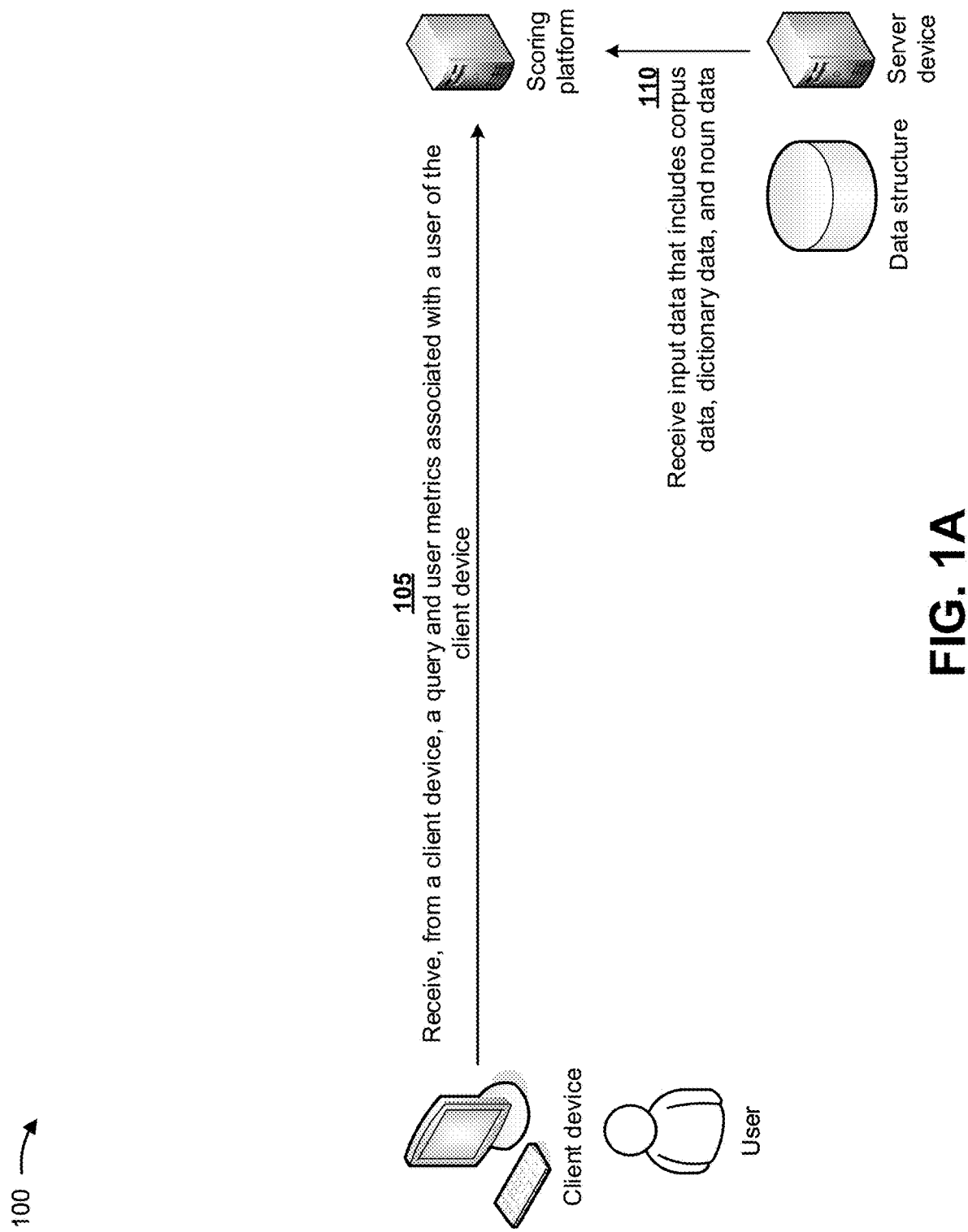
FIGS. 1A-1I are diagrams of one or more example implementations described herein.

The following detailed description of example implementations refers to the accompanying drawings. The same reference numbers in different drawings may identify the same or similar elements.

While the above-mentioned scoring metrics (e.g., TF-IDF and its variants) may be perfectly acceptable for a single query of a single term, both scoring metrics suffer from having an unconstrained output, especially for a large N, a large tf, and/or a small df. Specifically, the scoring metrics behave in unexpected ways when different datasets have different quantities of documents (i.e., a change in N), depending on a term distribution of content (i.e., a change in df), and from sentence to sentence inside a large document versus a small document (i.e., a change in the distribution of possible tf values). In the worst case, the exact same document, for a same query retrieved by a same search engine with a same organic search formula, will have a different score depending on the index in which the document occurs. Also, the same sentence or paragraph in two different documents, even in the same index, will be retrieved with different scores.

Furthermore, there is no established standard on how to compute a result of multi-term expressions when combined with common text search operators such as AND or OR. One search engine, for example, states that documents approved by a Boolean model are scored by a vector space model using a dot product. This means that scores for all terms in the expression are simply multiplied by their weights and added together to achieve a final (non-normalized) relevancy score. Since term scores only allow for relative ordering, similarly, output of the vector space model, as implemented by most search engines, is also only appropriate for relative ordering. Other scoring metrics include a max operator (i.e., an operator that takes a maximum score of the terms involved) and a boosting operator (i.e., where a score is boosted or not, based on a result of a secondary Boolean clause) can help to solve additional relevancy scoring needs, but still only produce unconstrained scores which are only useful for relative ordering of documents within a search result.

Current scoring metrics and methodologies for which multi-term scores are computed are unpredictable. When ranges of scores vary, seemingly arbitrarily, from query to query, from field to field, and from index to index, what appear to be simple changes to query structures or relevancy formulae will often have dramatic and unpredictable side-effects. All current search engines create a preference for search keywords which are found in a title of a document over keywords found in a body of the document. However, such relative weighting of search engine clauses is of little meaning when scores are not normalized. Searches with boosted title clauses perform much better than body searches alone by all available quality metrics (e.g., abandonment rate, discounted cumulative gain, user surveys, and/or the like).

When searching over large datasets, most current search engines distribute the search across multiple machines in a server cluster, each searching over a slice (or shard) of an entire index. The results are then combined into a single result set for the user. A problem occurs with this type of distributed search because, as shown above, a rank of a document will depend on other documents in the index. However, for efficiency, the document frequency numbers are often calculated separately for each index shard. This means that results from a distributed search cannot be combined and/or ranked across shards with good accuracy and efficiency.

Most current search engines cannot tell you if a desired document is in a particular index due to current search engine scoring methods. This is because, for search engines today, the numerical value of the score can only be used for relative ordering, and no judgment on the quality of the results can be determined from the relevancy score alone. Thus, even the highest numeric score given in an example above (10.660) does not necessarily indicate that the corresponding document would be desired by the user issuing the query; all of the results in that the corresponding set may be poor.

Search engines are often required to search over multiple, divergent datasets. For example, a business search application might return results from web pages, people, projects, electronic parts, and/or the like. Often the datasets searched by such business applications have nothing in common. For example, a first dataset may contain academic articles, a second dataset may contain parts information (e.g., numbers, names, and technical data) and a third dataset may contain employee names. In another example, a first dataset may contain web pages and a second data set may contain social media comments. Because scores from standard search engines are not comparable or normalized, results from these divergent datasets cannot be compared against each other, and it is impossible to determine if a document returned from one data set is better or worse than a document returned from a different, divergent dataset.

Thus, current search engines may waste computing resources (e.g., processing resources, memory resources, communication resources, and/or the like), networking resources, and/or the like associated with executing searches that provide unreliable search results, utilizing the unreliable search results, re-executing searches due to unreliable search results, and/or the like.

Some implementations described herein provide a scoring platform that utilizes search engine relevancy ranking models to generate normalized and comparable search engine scores. For example, the scoring platform may receive, from a client device, a user-specified query, and may construct the user-specified query as a query tree of operators that include zero or more operands. The scoring platform may produce, for each of the operators, a weight that indicates how valuable or confident a determination of relevancy of each of the operators is in relation to siblings in the query tree, wherein the weight is computed from metrics that are independent of any individual document being scored. The scoring platform may normalize weights for the siblings in the query tree with a parent operator according to a normalization formula. The scoring platform may produce, for each of the operators, a score, normalized to a value from zero to one and computed for the document, that represents how relevant the document is to the user-specified query, wherein the score is computed by each of the operators based on information available from children of each of the operators and from a search engine index. The scoring platform may determine a normalized score indicating how relevant the document is to the user-specified query based on applying the query tree to the document as a whole as well as to positions within the document, and may perform one or more actions based on the score.

In this way, the scoring platform utilizes search engine relevancy ranking models to generate normalized and comparable search engine scores. The scoring platform provides reliable scores in a predictable range, with interpretability (e.g., as probabilities, percentages or letter grades), and is substantially easier for practitioners to understand and manipulate to achieve desired relevancy scoring goals. Expressions can be reliably combined without having to worry about re-weighting of individual clauses to account for token variety, field size, and/or index size at every node within the query tree. By normalizing scores that are based on estimated probabilities to be in a range, such as from 0.0 to 1.0, the scoring platform may substantially mitigate or eliminate the distributed search problem (i.e., scores across all shards, just like scores across indexes, may be equally comparable). Further, by using better proximity scoring and other query statistics, the scoring platform may completely remove IDF and similar dataset-dependent statistics from a scoring model, which improves performance, conserves resources (e.g., computing resources, networking resources, and/or the like) and ensures that the document will be retrieved with the same score regardless of the index in which it resides. This, in turn, conserves computing resources, networking resources, and/or the like that would otherwise be wasted in executing searches that provide unreliable search results, utilizing the unreliable search results, re-executing searches due to unreliable search results, and/or the like.

FIGS. 1A-1I are diagrams of one or more example implementations 100 described herein. As shown in FIG. 1A, a client device may be associated with a server device, a data structure, and a scoring platform. The client device may include a mobile device, a computer, and/or the like associated with a user that performs a search query for identification of search results. The server device may include one or more devices associated with a data structure that stores corpus data, dictionary data, syntactic or semantic data, and/or the like. The scoring platform may include a platform that utilizes search engine relevancy ranking models to generate normalized and comparable search engine scores, as described herein.

As further shown in FIG. 1A, and by reference number 105, the scoring platform may receive, from the client device, a query and user metrics associated with a user of the client device. In some implementations, the user metrics may include data identifying demographics associated with the user, historical purchases made by the user, historical buying habits of the user, historical queries generated by the user, historical content browsed by the user, and/or the like.

As further shown in FIG. 1A, and by reference number 110, the scoring platform may receive input data that includes corpus data, dictionary data, syntactic data, semantic data and other data about the world or applicable domains. In some implementations, the scoring platform may receive the input data from a data structure (e.g., a database, a table, a list, and/or the like) associated with a scoring platform, a server device, and/or the like. In some implementations, the corpus data may include data identifying written or spoken language that provides insight into how language is actually used. The dictionary data may include data identifying terms and definitions provided in a dictionary. The syntactic or semantic data may include data identifying parts of speech utilized in particular languages (e.g., English, Spanish, and/or the like) or how words, phrases or concepts semantically relate to other words, phrases or concepts. The input data may include neural networks which have been trained on large text corpora.

Figure 1B:
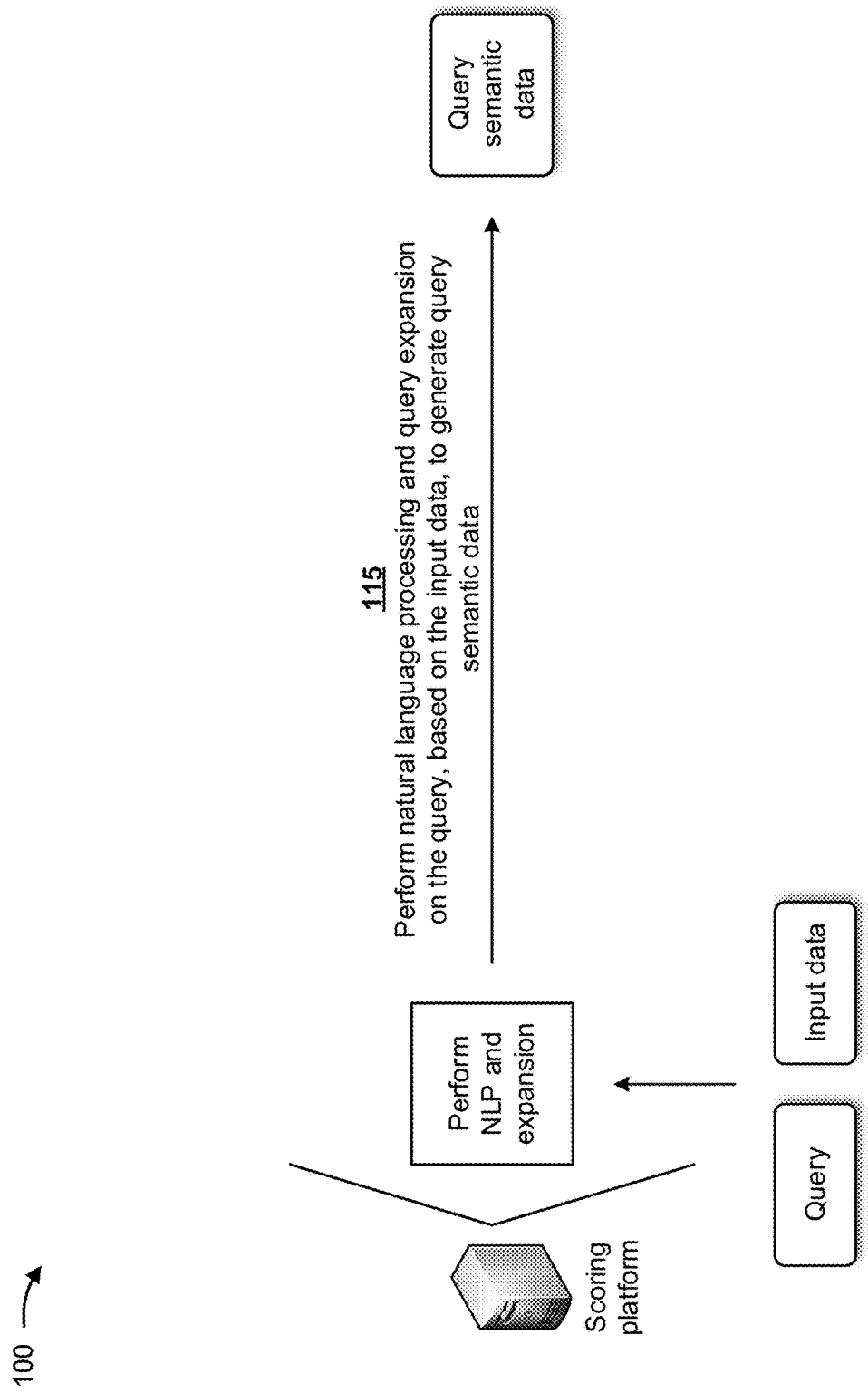

As shown in FIG. 1B, and by reference number 115, the scoring platform may perform natural language processing and query expansion on the query, based on the input data, to generate query semantic data. In some implementations, the query semantic data may include data identifying a necessary constraint in the query, an alternative term representation in the query, a semantically similar concept in the query, a domain defining term in the query, a negative indicator in the query, an optional term in the query, a multi-word term in the query, and/or the like. Examples of a necessary constraint, an alternative term representation, a semantically similar concept, a domain defining term, a negative indicator, an optional term, a multi-word term, and/or the like are provided below in connection with FIG. 1C.

When performing natural language processing, the scoring platform may identify search topics, may remove punctuations, may remove duplicates, may remove stop words and punctuations, may tokenize words in the query to enable analysis of the words, and/or the like. In some implementations, the scoring platform may remove stop words from the query, may pre-process the query, may apply lemmatization to the query, may create a set of resultant keywords for each sentence in the query, and/or the like in order to generate the query semantic data. In some implementations, when performing the natural language processing on the query, the scoring platform may remove punctuations from the query, may tokenize words in the query to enable analysis of the words, may remove sentences with less than a predetermined quantity of words from the query, may determine most frequent keywords utilized in the query, and/or the like. When performing the natural language processing on the query, the scoring platform may convert the query into machine-readable text, may split the machine-readable text into an array of words, may split the array of words into sequences of contiguous words, may calculate word scores for the sequences of contiguous words, and/or the like.

In some implementations, when performing query expansion on the query, the scoring platform may reformulate the query to improve retrieval performance by the query in information retrieval operations (e.g., in the context of query understanding). For example, the scoring platform may select and add terms to the query with a goal of minimizing query-document mismatch and thereby improving retrieval performance.

Figure 1C:
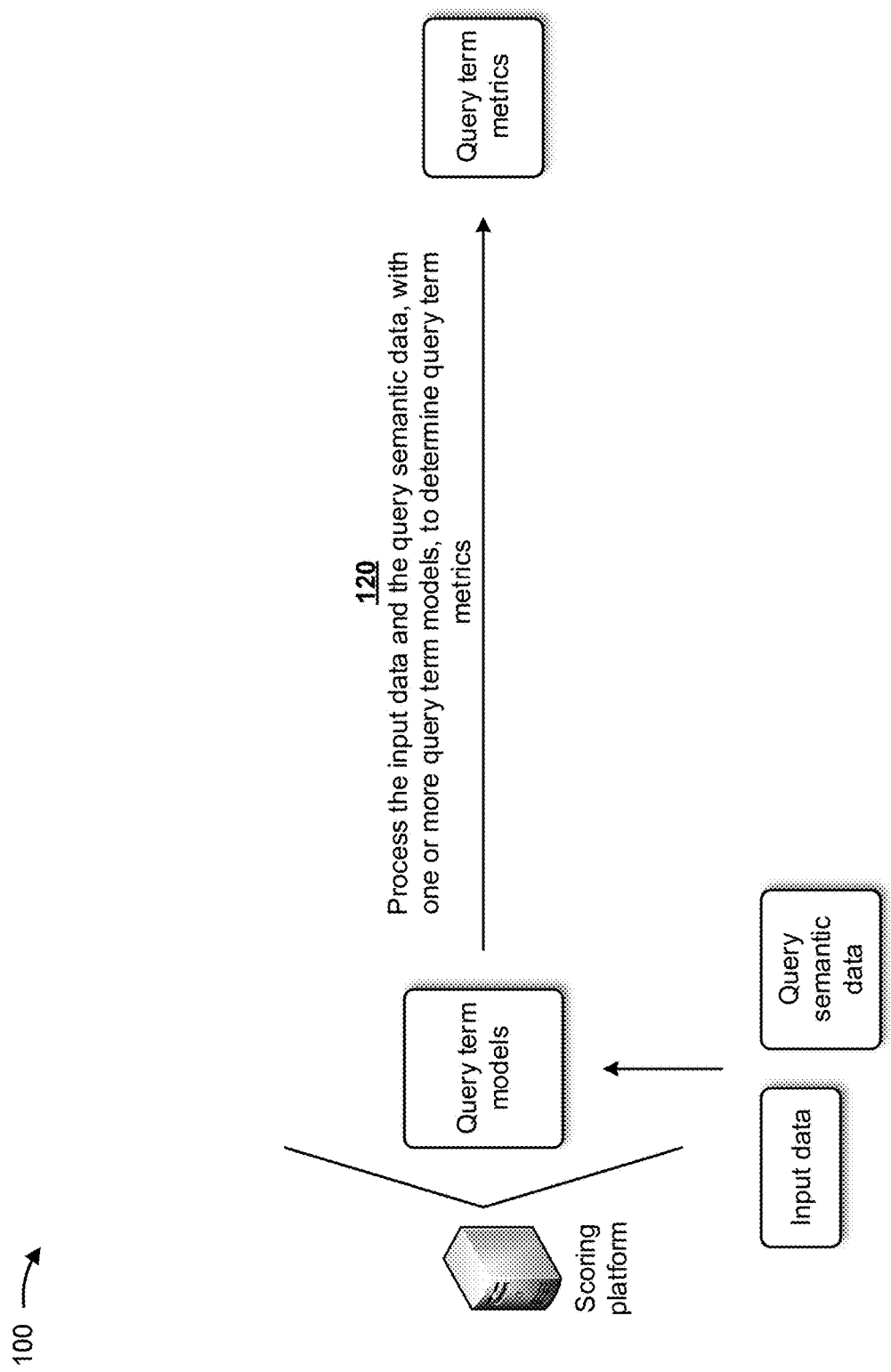

As shown in FIG. 1C, and by reference number 120, the scoring platform may process the input data and the query semantic data, with one or more query term models, to determine query term metrics. In some implementations, the scoring platform may train the query term models with historical data (e.g., historical input data and historical query semantic data) to generate trained query term models. Query term metrics can be as simple as the count or position of a term in the query text, or as complex as the word embedding vector for a query term as produced by a neural network trained on a large corpora of text content (e.g. Wikipedia). Other examples of query term metrics can include the part of speech of a query term, whether or not the term is part of a multiword phrase, how frequently the term has been used by a particular user, the position of the word in the query or phrase, etc. Query term metrics may be determined by machine learning. All query term metrics may be used to determine the semantic value or semantic purpose of a particular query term (or set of terms) within a query expression when determining document relevancy.

In some implementations, the query term metrics may provide indications of relative contributions of terms in the query to search goals of the user. For example, in a query such as "Argentina farming experience," highly descriptive words (e.g., "Argentina" and "farming") may be more important than a rather broad and ambiguous term (e.g., "experience"). The query term metrics may include metrics associated with IDF (e.g., judging a value of a query term based on how frequently it is used by documents within an index, where less frequently used query terms are thought to be more valuable, possibly computed using external corpora which returns IDF statistics that are independent of any particular document index); statistics about the query term and characters in the query term (e.g., character length, whether the query term contains digits or punctuation, a suffix of the query term, and/or the like); syntax (e.g., typical part of speech, whether the query term is used inside of a phrase, and/or the like); semantics (e.g., a quantity of ambiguous meanings, how widely or narrowly the query term is used, and/or the like); and/or the like. If the query contains expansion terms (e.g., alternative spellings, suffixes, semantic variations, and/or the like), then a semantic closeness (to the original query) and an ambiguity of an expanded term may contribute as well to an overall value of an expansion term to the query.

In some implementations, the scoring platform may capture a semantic structure of the query and may apply scoring methods to the semantic structure, which may improve search results for the query. In current search engines, the semantic structure of user requests has typically been encoded as a tree of query operators, such as and( ), or( ), phrase( ), boost( ), constant( ), filter( ), and/or the like.

The scoring platform may identify semantic structure in a search query, such as "traditional Argentina farming techniques." For example, the scoring platform may identify necessary constraints in the query, such as the concepts embodied by "Argentina" and "farming." Documents without these necessary constraints may be correctly scored as irrelevant (e.g., a document about Chinese farming and not Argentine farming, may have a low (or zero) score). The scoring platform may identify alternative term representations in the query, such as "Argentina" and "Argentine." It may be likely that documents with "Argentine farming" will be just as relevant as documents with "Argentina farming." Alternative term representations may include spelling variations (e.g., color and colour), verb variations (e.g., farm, farms, farming, and farmed), plural variations (e.g., technique and techniques), irregular variations (e.g., catch and caught, run and ran, and/or the like), and/or the like. However, some simple variations may have quite different semantic understanding. For example, glass may be a material, but the term "glasses" may typically be used to mean spectacles, and not multiple types of glass. Such subtleties should be captured in the semantic information and then used to create the query structures which create formulae aligned to the semantic intent and relationships of the query components to produce normalized relevancy scores which are then applied to both the document and the positions within the document.

The scoring platform may identify semantically similar concepts in the query. For example, since "farming" is semantically similar to "cultivate," "reap," "plow," "sow," and/or the like, a document that mentions "traditional Argentina plowing technique" would likely be considered as relevant. In another example, documents that mention locations within Argentina (e.g., Buenos Aires, Cordoba, and/or the like) or physically close to Argentina (e.g., Chile, Paraguay, and/or the like) may be relevant as well. The scoring platform may identify domain defining terms in the query. Terms may be ambiguous (e.g., "farming" may refer to wind farming, tax farming, server farms, and/or the like), and query context defining terms (e.g., "agriculture," "land," "soil," and/or the like) may be required to disambiguate a proper domain or context of query terms.

The scoring platform may identify negative indicators in the query. Negative indicators may be similar to domain defining terms, in that negative indicators eliminate ambiguous interpretations of query terms (e.g., if a document contains "server" or "server farm," then the document is less likely to be relevant for the query "Argentina farming techniques"). The scoring platform may identify optional terms that color a response in the query (e.g., "techniques" is likely an optional term that may color a response, reweighting some documents over others). The scoring platform may identify multi-word terms in the query. Many terms of the query may be multi-word phrases. Synonyms for "traditional" might include "long established" or "time honored" (i.e., in both of these cases, only the entire phrase will suffice). Locating documents with just "time" or just "honored" (or both in the same document but not together as a phrase) may be insufficient.

In some implementations, the semantic structures described above may be nested at many levels. For example, there may be a set of term variations of a semantically related term to a concept that is itself a necessary constraint. In this example, the set of term variations would be a sub-clause of the semantically related term, which would further be a sub-clause of the concept, which would be a sub-clause of the final query.

In some implementations, the sub-clauses and nesting structure of the semantic structures may be turned into a query tree of operators which represents a formula that can be used to determine how relevant a document is to the semantic structure of the query and to produce a normalized score that represents that relevancy judgment.

In some implementations, the scoring platform may produce separate term (and sub-clause) weights for nodes (operators or operands) in the query tree, allowing for weights to be normalized across the tree. Note that this normalization is done when constructing the query expression (i.e. without reference to any single document—before the query is used to search for documents). In one implementation, the scoring platform may normalize the weights across query terms in a query expression by dividing the query term weights by a sum total of the weights:

$$W_{norm}(t) = \frac{W(t)}{\sum_{i=1}^{n} W(t_i)}$$

This may turn all the $W_{norm}(t)$ factors into percentages of the total weights, preserving their relative sizes. This may be an appropriate normalizer of confidence weights when each of the factors represents a portion of the whole.

In some implementations, the scoring platform may normalize query term weights in the query expression based on a Euclidean magnitude:

$$W_{norm}(t) = \frac{W(t)}{\sqrt{\sum_{i=1}^{n} W(t_i)^2}}$$

where the denominator may correspond to a Euclidean distance of the query weights from 0. This may ensure that all weighted terms are between 0.0 and 1.0 and that a vector of weights is a unit-length vector. Unit-normalized vectors may minimize irregular score variations between large and small query vectors when applied to documents as part of computing the final relevancy scores.

In some implementations, the scoring platform may utilize T-score normalization to scale the query term weights in the query expression around a mean and considering a standard deviation:

$$W_{norm}(t) = 0.5 + D * \frac{W(t) - \mu}{\sigma}$$

where $$\mu = Mean = \frac{\sum_{i=1}^{n} W(t_i)}{n}$$

and $$\sigma = StdDev = \sqrt{\frac{1}{n}\sum_{i=1}^{n}(W(t_i) - \mu)^2},$$

where n may correspond to a count of terms (operands) in the query (or operator) and D may represent a dispersion (e.g., how widely to distribute the weights over the desired range, where each D may represent one standard deviation). Generally, D=0.2 (a default) may provide outputs that are a good range and generally safe for a small number (e.g., less than 10) of query terms with input values between 0 and 50.

In some implementations, the scoring platform may utilize a softmax normalization that is similar to an arithmetic mean, except that all values are converted to exponents of e:

$$W_{norm}(t) = \frac{e^{W(t)}}{\sum_{i=1}^{n} e^{W(t_i)}}.$$

Other values may be used in place of e. The softmax normalization may emphasize large weights and further de-emphasize small weights, creating a more "Boolean AND-like" effect where the absence of an important query term when applied to a document during the search process can dramatically reduce the final relevancy score for that document.

In some implementations, the scoring platform may utilize a max normalization to normalize all of the weights to a maximum weight found among the operands within the query operator. If, for example, an inverse document frequency of a term from a corpora is used as the term weight for each query term in a query expression, a normalized weight for each query term may be:

$$W_{norm}(t) = \frac{W(t)}{\max_{i=1 \text{ to } n} W(t_i)},$$

where $t_i$ may correspond to terms in the query (or query operand) and n may correspond to a total count of those terms (or operands). W(t) may be IDF(t) or any function of the term t that is independent of the document being matched (i.e., can be computed before the search begins). The max normalizer may be preferred over a min-max normalizer in common use in other domains because the min-max normalizer creates weights which are 0, which would remove them from the search expression.

In some implementations, the semantic structure for queries, including how query terms are semantically related and weighted against each other may itself be a Neural Network that has been trained based on past historical data of prior queries and prior relevancy judgments and which, internal to the Neural Network, contains information on the semantic relationship of the query terms to each other and to the final, holistic purpose of the intent of the query, expressed as weights of inputs and interior Neural Network nodes.

Figure 1D:
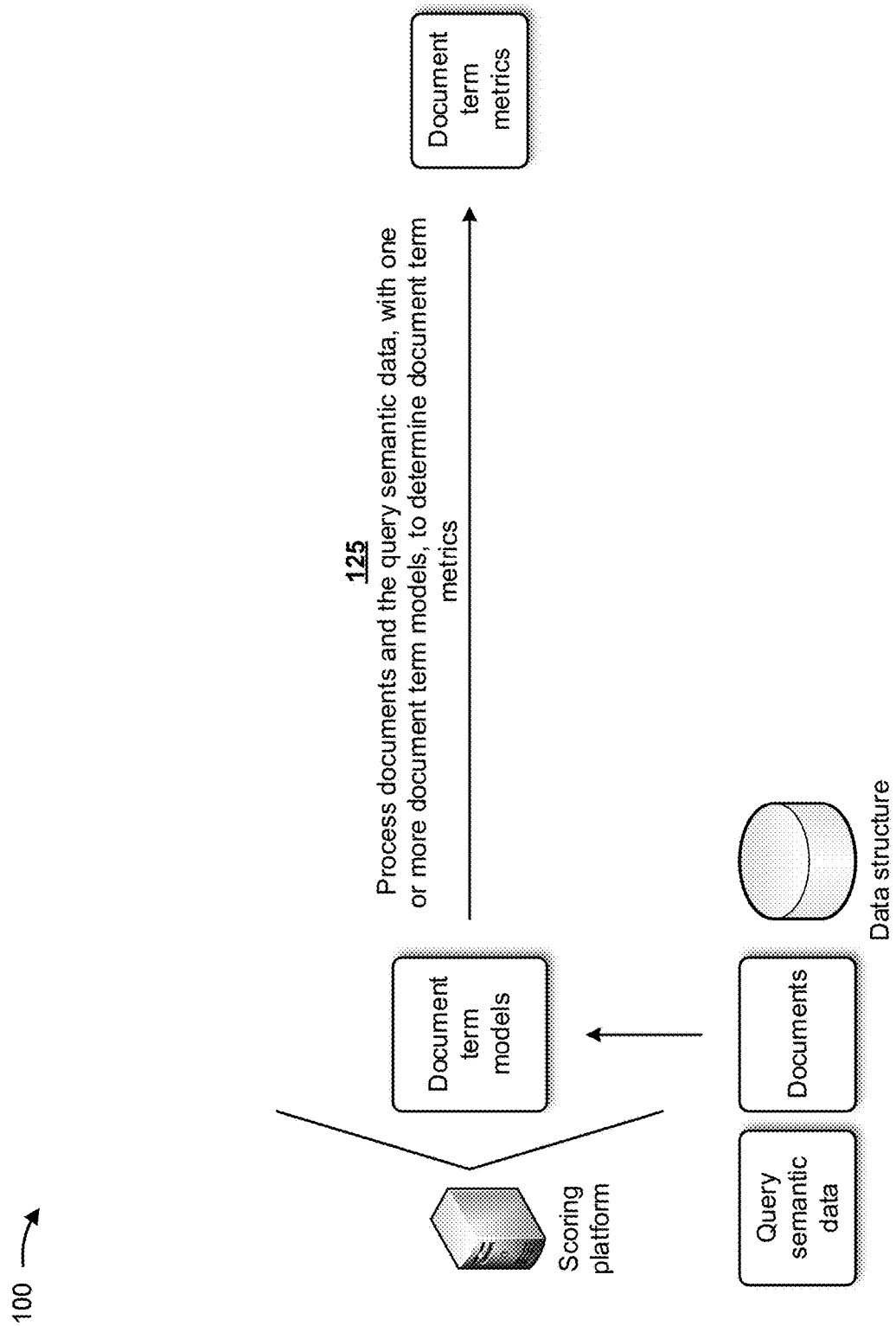

As shown in FIG. 1D, and by reference number 125, the scoring platform may process documents (e.g., received from a data structure) with one or more document term models, to determine document term metrics. In some implementations, the document term metrics may indicate how document terms are associated with the entire content of a document, or to a sentence, a paragraph, a section, and/or the like within the document. For example, document term metrics may include a count of the term in the document (e.g. term frequency), aggregated position information (e.g., position of first occurrence, a standard deviation of occurrence positions, and/or the like), which document fields contain the term (e.g., is the term in a title, abstract, author list, and/or the like), how many sentences contain the term, is the term used as the subject of a sentence (and which ones and how many), and/or the like.

To improve performance, document term metrics may only be computed for terms, words, phrases or concepts of interest as specified in the query expression to be executed. As an alternative, document term metrics for every term (including words, phrases or concepts) in every document may be precomputed and stored in persistent storage for fast recall when needed to compute the final document relevancy score.

In some implementations, the scoring platform may compute document term metrics using historical data (e.g., historical documents and historical query semantic data). Further, document term metrics may be the output of machine learning or neural network models (perhaps trained on historical data) when applied to the terms within the document.

In some implementations, document term metrics computed by document term models may be used as input to a function which converts the metrics, possibly utilizing a query term weight, to produce a normalized 0 to 1 score for the document term which identifies the contribution of that term to the overall relevancy of the document within the query expression the represents the semantic intent of the user's query. Sample functions to produce normalized scores from document term metrics may include one or more of a sigmoid model, a half-logistic function model, a log cumulative distribution model, a logistic regression model, a half-sigmoid model, and/or the like. Note that these models produce normalized scores (with values typically normalized from 0.0 to 1.0), not to be confused with confidence weight normalizing models which normalize confidence weights across sibling operators underneath a parent operator.

In some implementations, the scoring platform may utilize a sigmoid model that scales document term metrics using a logistic sigmoid function:

$$\text{Score}(t) = \frac{1}{\left(1 + e^{s \cdot \left(\frac{-t}{max} + 0.5\right)}\right)}$$

where t may correspond to a non-normalized document term metric output (for example, TF-IDF), max may correspond to a maximum anticipated value of t, and s may correspond to a scaling constant that determines a sharpness or steepness of a curve. The sigmoid model may be utilized if an importance in variations of both low and high values of an input are to be deemphasized.

In some implementations, the scoring platform may round-off high values, using half of the logistic sigmoid function, and stretching out the function to cover a y-range of 0.0 to 1.0 and an x-range of 0 to max:

$$\text{Score}(t) = \frac{2}{\left(1 + e^{s \cdot \left(\frac{-t}{max}\right)}\right)} - 1.$$

This function has an advantage of mirroring a distribution curve for the values of a particular document term metric which may be log-normal in shape (TF, the term frequency of a term in a document would be a good example of a log-normal document term metric). Using the half-logistic sigmoid function may provide a more dynamic range for densely-crowded low values and less dynamic range for more sparsely-populated high-values.

In the sigmoid and half-sigmoid functions, the parameters may indicate a sharpness or a steepness of the sigmoid function. Higher values of s may provide more of a Boolean effect, while lower values are more linear. In some implementations, the scoring platform may split the query term metrics (the "confidence weight" attribute computed for each query term or sub-expression) apart from the normalized score values produced by the function (which vary for every document). As a result, two values may be provided to a parent operator: a relative confidence weight of a term (which can be normalized across operands provided to the operator), and a 0.0 to 1.0 normalized term score.

In some implementations, the scoring platform may utilize a cumulative distribution function of a log of the document metric input data for a term in a document. Use of the cumulative distribution function may require that an average and a standard deviation of the log of the input data be precomputed and provided as parameters. The cumulative distribution function may depend on an error function (erf(x)) that is a numerical approximation. The scoring platform may utilize a cumulative distribution function for a log-normal function. Such a function may provide an optimized curve that matches a dynamic range at every point along the input data curve (e.g., for input data which is log-normal in distribution), and may produce a true probability (e.g., a probability that document term with a specified metric falls within the specified range).

In some implementations, to produce true probabilities for a term in the document when applied to query expression (i.e. the probability that an entire document is relevant based on the presence of a term with a specific set of term metrics in the document), the scoring platform may utilize a logistic regression over document term data that may be performed and provided as coefficients into an operator to produce normalized scores. For example, the scoring platform may utilize a logistic regression model to predict a likelihood of a term appearing in a title of a document as an indicator as to how relevant the document is to the query. The logistic regression normalization model may optimize document term metrics and scoring formula to produce scores which are true probability scores (e.g., from 0.0 to 1.0) that are comparable and more easily combined into larger and more complicated search expressions. A quantity (e.g., dozens) of raw and transformed signals/metrics for each term in each document may be utilized with the logistic regression normalization model. The regression analysis may also include a combination of query term metrics, document term metrics, document quality metrics, user metrics, proximity metrics, and/or the like.

Figure 1E:
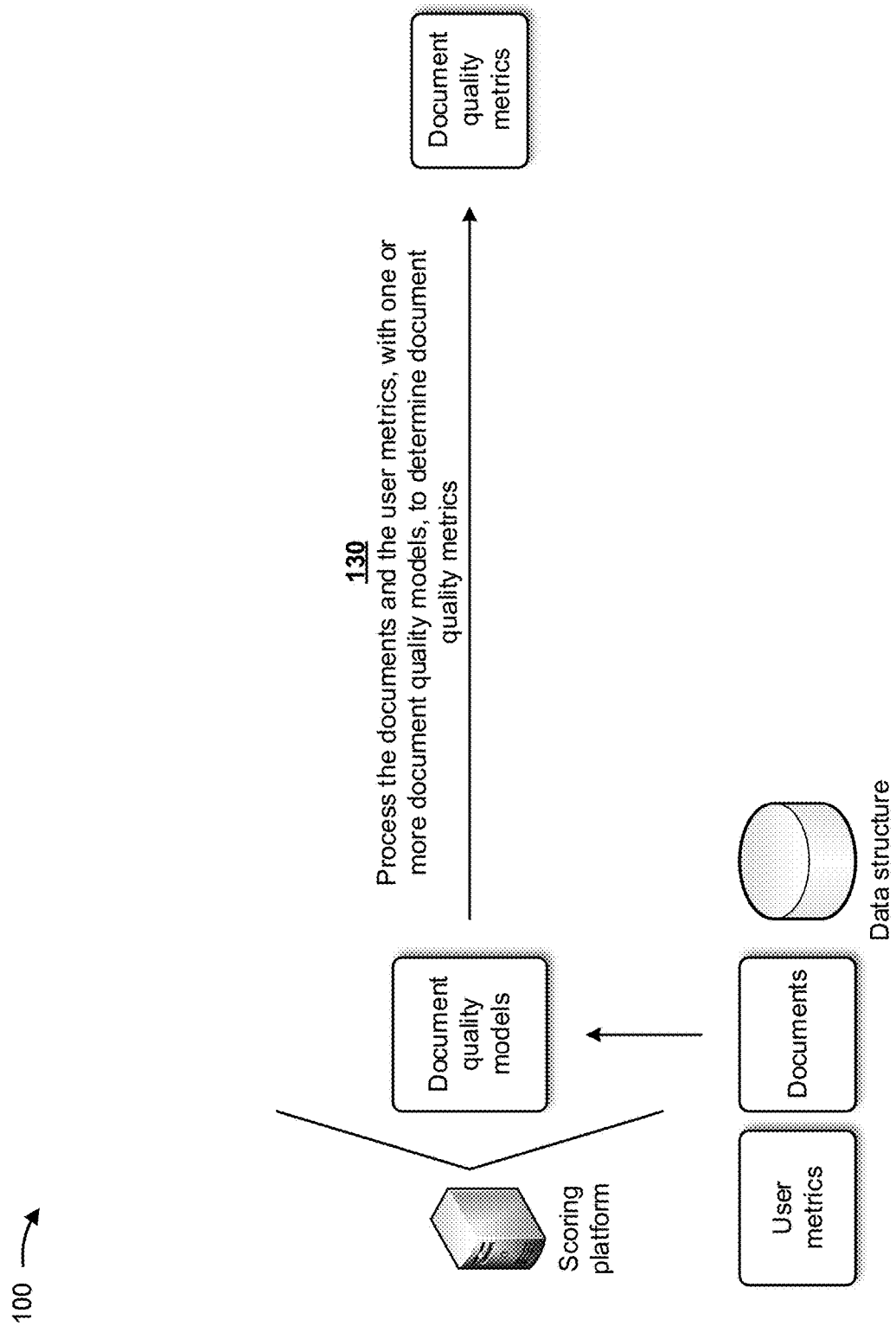

As shown in FIG. 1E, and by reference number 130, the scoring platform may process the documents with one or more document quality models, to determine document quality metrics. Document quality metrics determine the overall quality or utility of a document, usually independent of any particular query or user request. For example, documents which appear to be spam, documents which are very old, documents which are very broad and ambiguous, or (conversely) documents which are too narrow, or documents from unreliable sources may all be flagged as "poor quality"

which may be used in final relevancy scoring. The scoring platform may train the document quality models with historical data (e.g., historical documents and historical user metrics) to enable the document quality models to determine the document quality metrics, as described herein. In some implementations, rather than training the document quality models, the scoring platform may obtain the document quality models (or quality data) from another system or device that trained the document quality models. In this case, the scoring platform may provide the other system or device with historical data for use in training the document quality models, and may provide the other system or device with updated historical data to retrain the document quality models in order to update the document quality models.

In some implementations, the document quality metrics may indicate, independent of the query, how useful a document is compared to other documents in the index (e.g., based on a spam score, where some documents are more authoritative than others). The document quality metrics may include document metadata (e.g., a creation date, a last modified date, an age, a content source, author information, and/or the like), document semantics (e.g., a genre, semantic cohesion, an industry focus, generic or specific, and/or the like), document usage data (e.g., popularity, number of downloads, and/or the like), and/or the like.

The scoring platform may utilize operators to handle and normalize document quality metrics. These operators may combine multiple document metadata fields into a normalized (0.0 to 1.0) document quality score. As an example, there may be separate operators for dates and numbers. In some implementations, the scoring platform may utilize a logistic sigmoid function for date weighting:

$$Score(\text{age in days}) = \frac{1}{1 + e^{6\left(\frac{2 \cdot age - max - min}{max - min}\right)}}$$

The scoring platform may utilize the sigmoid function and a half-sigmoid function for scaling numbers (e.g., numeric values) that represent document metrics. The formula for the sigmoid function is:

$$Score(x) = \frac{1}{1 + e^{-d \cdot 6 \cdot \left(\frac{2 \cdot x - max - min}{max - min}\right)}}$$

where x may correspond to a value of the numeric field for the document as stored in the index. The formula for the half-sigmoid function is:

$$Score(x) = \begin{cases} 0.5 - \frac{d}{2}, & x < min \\ d \cdot \frac{2}{1 + e^{\frac{-6(x - min)}{(max - min)}}} + 0.5, & x \geq min \end{cases}$$

A slope may be greatest close to input=min, and then may taper off (getting either closer to 1.0 or closer to 0.0) as the input increases towards maximum. Other than dates and numeric values, a third type of data that may impact document quality is category and Boolean fields (e.g., source, document type, is approved, and/or the like).

Figure 1F:
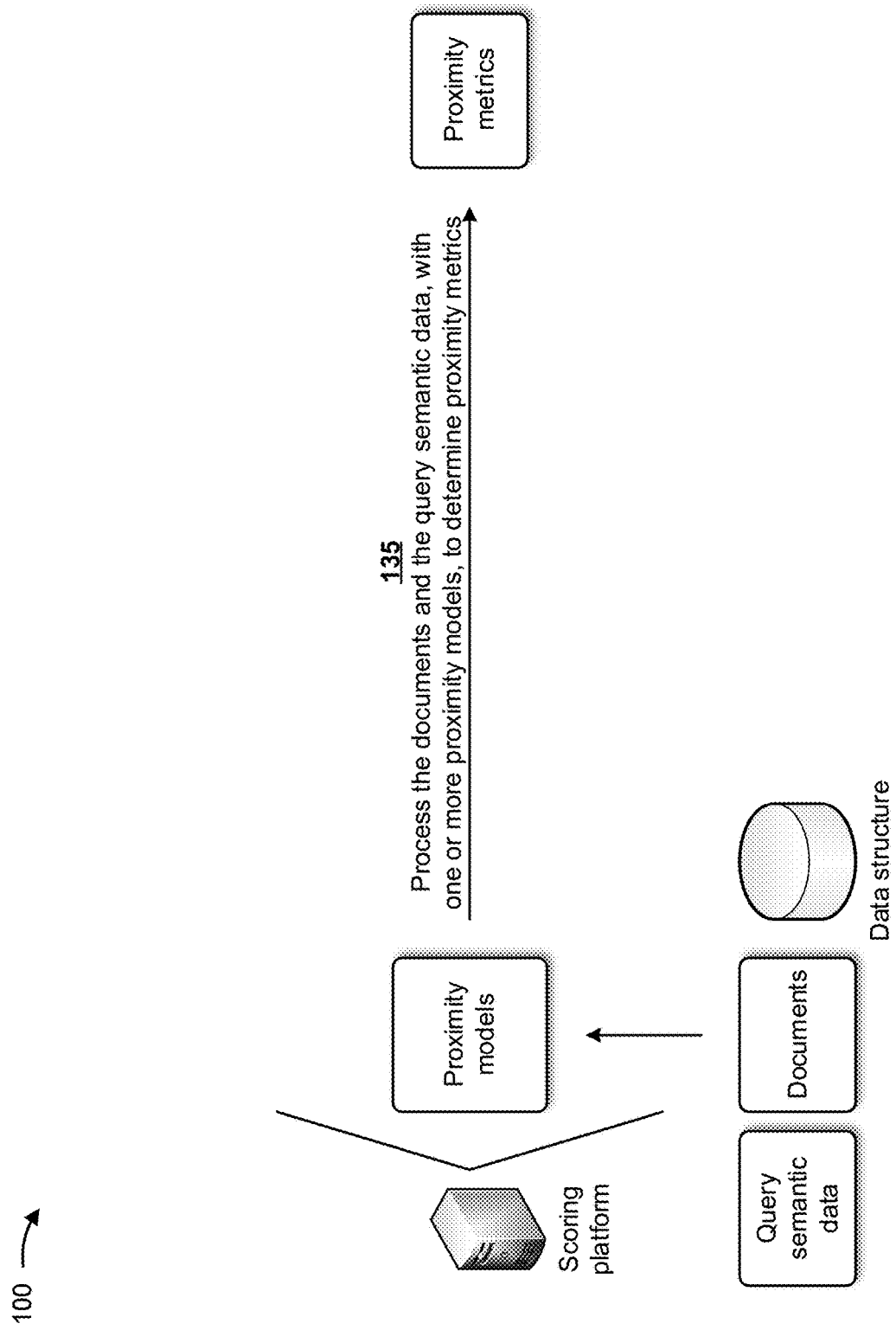

As shown in FIG. 1F, and by reference number 135, the scoring platform may process the documents and the query semantic data, with one or more proximity models, to determine proximity metrics. In some implementations, the one or more proximity models may include one or more logistic sigmoid models that determine a width of a weighting window to be applied across term positions within a document. The scoring platform may apply, based on position within the weighting window, proximity weights to terms in the documents that match terms in the query, and may determine the proximity metrics based on applying the proximity weights to the terms in the documents that match the terms in the query for every position where a query term or concept exists within the document.

In some implementations, the proximity metrics may identify how well individual occurrences of a term within a document represent an intent of the query. For example, the proximity metrics may provide indications of how close together terms of the query occur within the documents. The proximity metrics may vary based on a position of the term and its relationship to other query term occurrences found in the document. Generally, query terms that are closer together in the document are more supportive of each other than if the query terms are widely distributed throughout the document. The proximity metrics may include multi-dimensional vectors and other complex data structures, such as word and sentence embeddings from neural networks (e.g., how similar a neural network embedding of the query is to a neural network embedding of each sentence in the document), presentational clues in the document (e.g., is a query term in bold or italics within the document), and/or the like. In some implementations, the proximity metrics may be aggregated (e.g., a maximum, a sum, an average, and/or the like) into a proximity score for the query for the entire document. The scoring platform may include the proximity metrics into relevancy scores and may also return proximity metrics as part of search results for further in-depth analysis or display.

In some implementations, the scoring platform may perform proximity weighting. Proximity weighting is a weighting of terms based on how close the terms are together inside a document. The proximity weighting may use a smooth windowing (e.g., no sharp cutoffs as words drift out of arbitrary window sizes), may provide a smooth score increase (e.g., relevancy score smoothly increases as words get closer to one another), may handle multiple terms (e.g., works as well for two-term queries as for ninety-term queries), may be adjustable (e.g., can be adjusted for different window sizes and different distance-to-score functions), may be cognizant of query structure (e.g., can handle complex query structures), and/or the like.

Each document can be thought of as a list of terms. When a term in the document matches a query term (either exactly, by variation, or by semantic distance) then that term is a hit or an occurrence. For example, TA, TB, TC, and TD may be terms in the query which are also in the document. A window may be currently centered on TB. TD may be in the document (2 positions), TC (−6 positions), and TA (+9 positions). In this example, the weights applied to each term may be: TB=1.0, TD=0.99, TC=0.48, and TA=0.05. Only a closest instance of each term to the center term occurrence may be considered. Other occurrences of TD, for example, which are further away may be ignored, even if they are well within the window. The weights may be applied to the chosen query formula (e.g., weighted average, probability combination, and/or the like), which may also be a complex formula of nested expressions. A result of the query formula may be the score for the center position (e.g., a score for term TB in the example above). Finally, a maximum of all of the scores for all of the positions may be determined, and that may be a max hit score for the entire document, which may be returned as the entire document's overall proximity score.

A proximity weighting envelope model may utilize a logistic sigmoid on both sides of the window. Two parameters may be defined to control the window (e.g., P=width of the plateau region, S=size of the weighting window). With these constants (P, S), a formula for the weighting window is:

$$W_{dist} = \frac{1}{1 + e^{\left(6 \cdot \frac{4x-S-P}{S-P}\right)}} + \frac{1}{1 + e^{\left(6 \cdot \frac{-4x-S-P}{S-P}\right)}} - 1$$

Other weighting envelopes may be used.

Figure 1G:
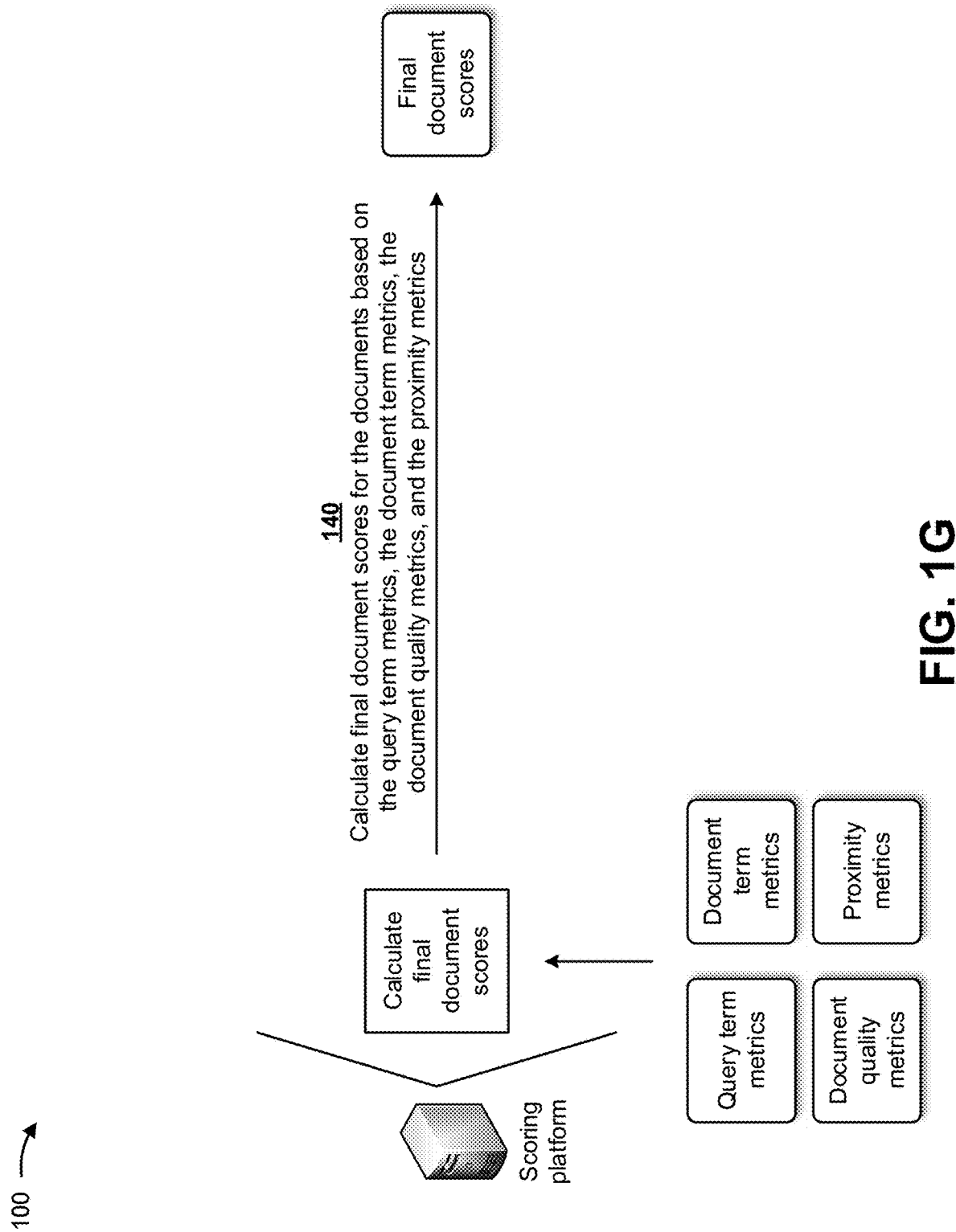

As shown in FIG. 1G, and by reference number 140, the scoring platform may calculate final document scores for the documents based on the query term metrics, the document term metrics, the document quality metrics, and the proximity metrics. In some implementations, if there is available knowledge about a user, the scoring platform may utilize the user metrics for personalization of the relevancy scoring algorithm. The user metrics may include user demographics (e.g., employee role, job, location, family, age, sex, and/or the like), past purchases and buying habits, past queries, content browsed, and/or the like. The scoring platform may combine the user metrics with the document metrics to modify document quality scores so that the document quality scores are personalized to the user submitting the request.

In some implementations, when calculating the final document scores for the documents, the scoring platform may utilize one or more scoring models, such as one or more of an average score model, a soft AND model or a soft OR model, a maximum score model, a probability score model, a sum score model, a multiplication score model, a vector similarity scoring model, and/or the like to calculate the final document scores for the documents. The scoring platform may train the scoring models with historical data (e.g., historical query term metrics, historical document term metrics, historical document quality metrics, and historical proximity metrics) to enable the scoring models to determine the final document scores, as described herein. In some implementations, rather than training the scoring models, the scoring platform may obtain the scoring models from another system or device that trained the scoring models. In this case, the scoring platform may provide the other system or device with historical data for use in training the scoring models, and may provide the other system or device with updated historical data to retrain the scoring models in order to update the scoring models.

In some implementations, once normalized term weights have been computed, the scoring platform may combine terms into complex expressions of AND (all terms must be present in the document) and OR (at least one term must be present). Models for combining multiple query terms into a composite score, which would be the normalized (0 to 1) score produced by a search operator, may include providing a new operator for OR and a new operator for AND, each with several options for computing a resulting normalized score. These complex expressions may be the result of understanding query semantics and creating structures based on those query semantics. Alternatively, these complex expressions may simply represent heuristic algorithms for combining metrics (e.g. query-term metrics, document-term metrics, proximity metrics, and other metrics) together to provide the final relevancy score for the document. Finally, these complex expressions may be determined automatically, say with a Neural Network, based on training with machine learning.

Figure 1H:
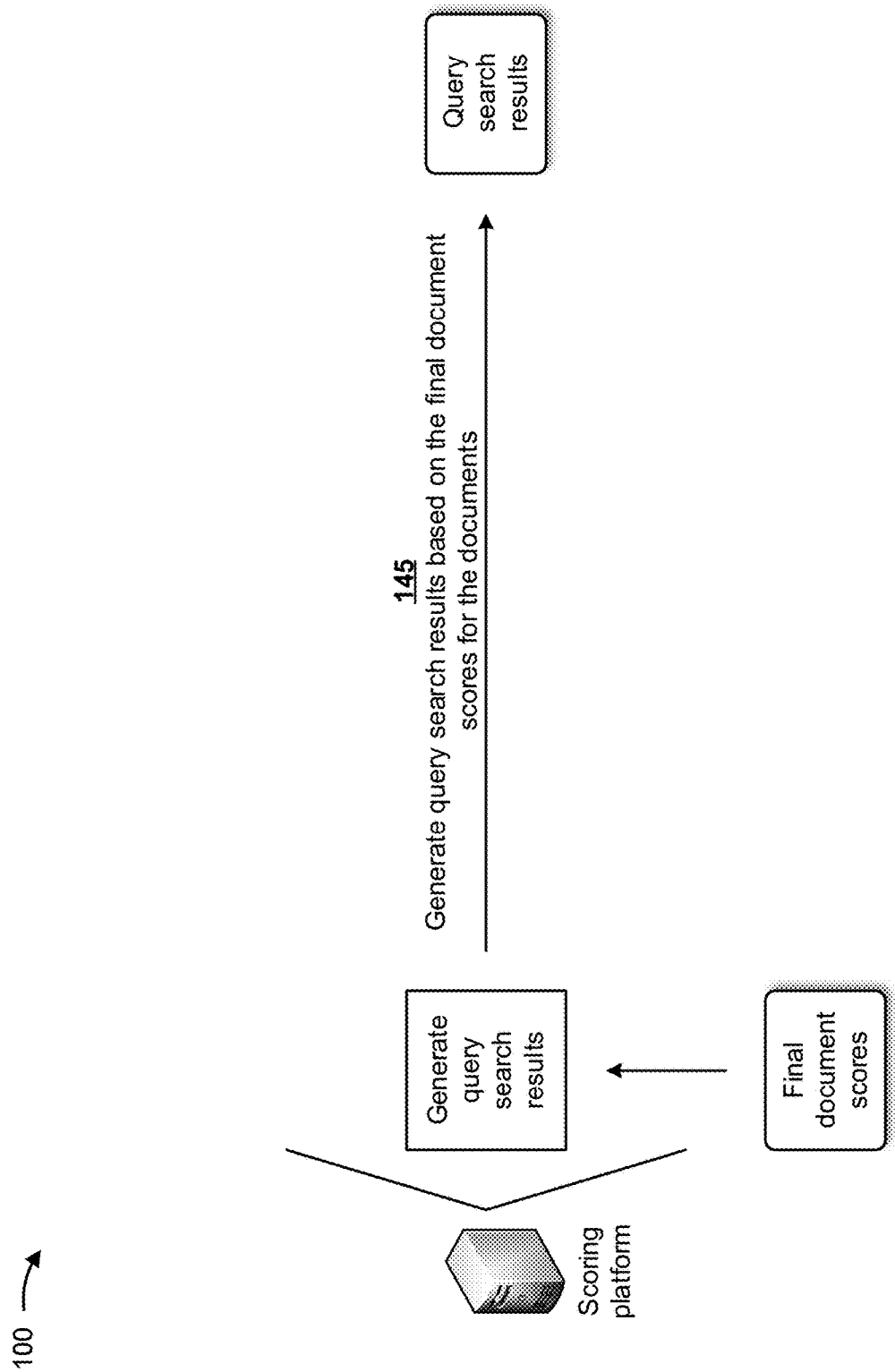

As shown in FIG. 1H, and by reference number 145, the scoring platform may generate query search results based on the final document scores for the documents. In some implementations, the query search results may include information identifying the highest ranked documents based on the final document scores. For example, the query search results may include hyperlinks to the highest ranked documents, document metadata, snippets (e.g., summaries) of text from the highest ranked documents, information identifying the final document scores for the highest ranked documents, and/or the like. In some implementations, the query search results may include information identifying documents associated with the final document scores and may omit documents that include final document scores of zero. In some implementations, the query search results may be arranged in a manner other than the highest ranked documents. In some implementations, the search results may be arranged visually, plotting different dimensions of normalized relevancy across multiple axis.

Figure 1I:
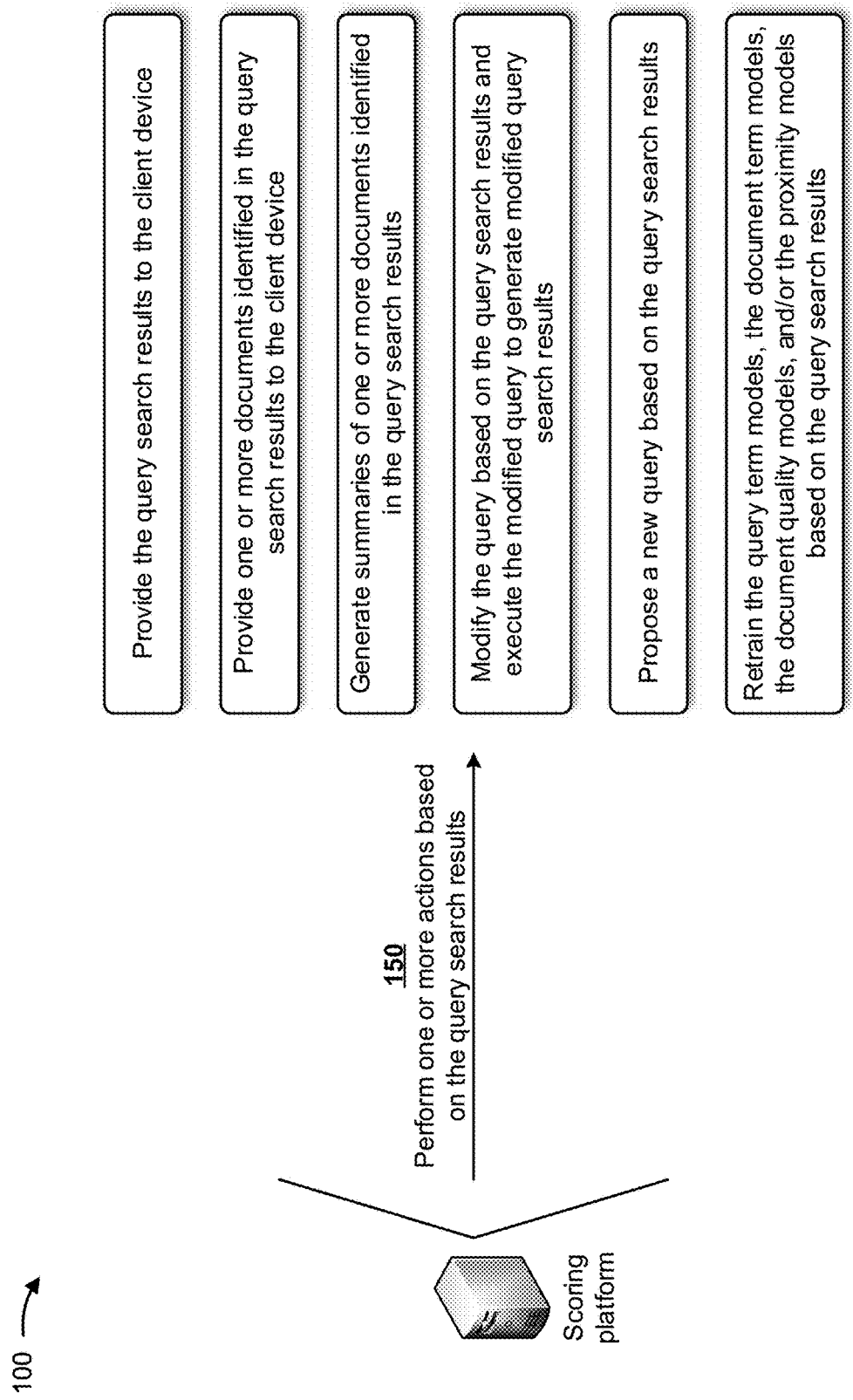

As shown in FIG. 1I, and by reference number 150, the scoring platform may perform one or more actions based on the query search results. In some implementations, the one or more actions may include the scoring platform providing the query search results to the client device. In this way, the scoring platform may enable the user to review query search results with improved relevancy to search queries, may provide reliable final document scores in a predictable range (e.g., with probabilities that are substantially easier to understand and manipulate to achieve desired relevancy scoring goals), may enable the user to more readily select from among the query search results information most likely to benefit the user, may provide judgements and confidence assessments as to whether the user's requested information is (or is not) in the index at all, and/or the like. In some implementations, this information may be plotted visually. This may conserve computing resources (e.g., processing resources, memory resources, communication resources, and/or the like), networking resources, and/or the like that would otherwise be wasted in reviewing query search results, performing additional searches to find the most relevant, reliable, interpretable and/or understandable query search results, and/or the like.

In some implementations, the one or more actions may include the scoring platform providing one or more documents identified in the query search results to the client device. In this way, the scoring platform may automatically identify and provide documents associated with query search results that are relevant, reliable, interpretable, and/or understandable, thereby conserving computing resources, networking resources, and/or the like that would otherwise be wasted manually selecting and obtaining documents associated with the query search results.

In some implementations, the one or more actions may include the scoring platform generating summaries of one or more documents identified in the query search results or identifying locations within the document which best match the semantic intent of the query. In this way, the scoring platform may enable the user to more quickly and efficiently review and assess the relevancy of the query search results, thereby conserving computing resources, networking resources, and/or the like that would otherwise be wasted in reviewing entire documents.

In some implementations, the one or more actions may include the scoring platform modifying the query based on the query search results and executing the modified query to generate modified query search results. In this way, the scoring platform may automatically improve the relevancy of the query search results and provide search results more relevant to the query (given what is available in the index), to goals of the query, and/or the like, thereby conserving computing resources, networking resources, and/or the like that would otherwise be wasted in honing query search results and performing additional query searches.

In some implementations, the one or more actions may include the scoring platform proposing a new query based on the query search results. In this way, the scoring platform may automatically determine a new query likely to provide improved query search results, while allowing the user to accept, reject, or modify the new query before performing a search, thereby conserving computing resources, networking resources, and/or the like that would otherwise be wasted in performing searches that do not produce relevant, reliable, interpretable, and/or understandable search results. For example, if the original query can be determined, based on the normalized score, to have no representative documents in the index, an action can be made to propose a similar but different query for the user to execute. The different query may contain different concepts and terms which may be closely related to the original terms. As an example, if there is no document specifically about "Farming in Argentina", then the system may submit a query for "Farming in Paraguay," a neighboring country to Argentina, or "Farming in South America".

In some implementations, the one or more actions may include the scoring platform retraining the query term models, the document term models, the document quality models, and/or the proximity models based on the query search results. In this way, the scoring platform may improve the accuracy of the query term models, the document term models, the document quality models, and/or the proximity models in determining query term metrics, document term metrics, document quality metrics, and/or proximity metrics, thereby improving speed and efficiency of the models and conserving computing resources, networking resources, and/ or the like that would otherwise be wasted in determining the metrics with models having less training.

In some implementations, the one or more actions may include the scoring platform generating an alternative query based on the query search results, determining a location of a document identified in the query search results, recommending an alternative search mechanism based on the query search results, recommending more generalized query terms for the query based on the query search results, generating a graphic visualization for a document identified in the query search results, and/or the like.

In some implementations, the scoring platform may utilize an open-source or vendor-built closed-source search engine framework, and/or the like. For example, the scoring platform may implement new search engine operators (e.g., as described herein) for an existing search engine framework, and may wrap the operators as plug-ins to the search platform. In this way, the scoring platform may encourage the development of models that combine more relevancy signals into a single, holistic relevancy score, and may further expand the search engines to include deep learning neural network models and machine learning methods at different layers.

In some implementations, the scoring platform may implement scoring by providing new search engine operators for a search engine. One search engine operator may include a normalized term operator that returns a 0.0 to 1.0 document term score for each term plus a query term weight that can be used to weight this term in relation to other terms in the query.

In some implementations, the scoring platform may split a query term weighting (e.g., the confidence weight attribute) apart from a document term score (e.g., which varies for every document). This means that two values may be provided from the child operators to their parent operator: relative weights of terms or sub-expressions (e.g., that may be normalized across operands provided to an operator), and the 0.0 to 1.0 normalized term score.

Once sub-clause weights have been normalized, the scoring platform may combine the normalized weights with the sub-clause scores and may compute a final score for the operator as a whole. In some implementations, the scoring platform may compute the score for an operator by performing a simple weighted average of the scores of its sub-clauses (operands).

$$\text{Score} = \frac{\sum_{i=1}^{n} w_i o_i}{\sum_{i=1}^{n} w_i}$$

where n may correspond to a number of operands to the AND or operator, $o_i$ may correspond to a score computed for the specified operand, and $w_i$ may correspond to a weighting value for that operand. When interpreted as probabilities, $o_i$ may correspond to a probability that the document which satisfies the operand is relevant, and $w_i$ may correspond to a relative confidence of the measurement. Each operand may be a wholly independent measurement of the probability of relevance of the resulting document, and the weights may be relative confidence measurements for each sub-clause. The weighted average may provide more weight to those measurements of probability which have higher confidence.

The scoring platform may utilize the weighted average for necessary clauses that must be present in the document to achieve a good score. The weighted average may be an appropriate score for AND operators as well as OR operators. With the weighted average, portions of the overall scores are divided up among all of the operands, and a strength of each operand contributes to its own portion of the final score.

By raising the output of the weighted average to a power factor, the scoring platform may make the output more "AND-like" or "OR-like."

$$\text{Score} = \left( \frac{\sum_{i=1}^{n} w_i o_i}{\sum_{i=1}^{n} w_i} \right)^K$$

where a positive value of K determines how much AND-ness (K>1) or OR-ness (K<1) the operator exhibits.

In some implementations, the scoring platform may return a maximum input as the score for the operator as a whole:

$$\text{Score} = \max_{i=1}^{n} \{w_i o_i\}$$

This may be referred as a DISMAX (disjunction max) operator. Disjunction max may be used to prevent high-frequency, but low-quality, terms from overwhelming lower-frequency, but higher-quality terms, typically within AND/OR expressions. With standard OR mathematics, a strong clause may overwhelm a weak clause, causing results with too little representation from one clause or the other.

In some implementations, the scoring platform may utilize other smoothing maximum models, such as soft-max:

$$Score = \frac{\sum_{i=1}^{n} o_i e^{\alpha o_i}}{\sum_{i=1}^{n} e^{\alpha o_i}}$$

The constant $\alpha$ can be varied to determine an amount of max-ness of the function. A value of $\alpha=0$ may reduce the function to a simple arithmetic mean. With larger values of $\alpha$, the function may become more and more like the max function.

In some implementations, the scoring platform may assume that each of the clauses represents a conditional probability such that, if the document contains a term X, then the document is some percentage likely to be relevant. This may be visualized as a Venn diagram. In the Venn diagram, if a document contains the term X, then there is, for example, an 80% chance that it will be relevant. Extending this to multiple terms provides the following formula:

$$Score = 1 - \prod_{i=1}^{n} (1 - w_i o_i)$$

In some implementations, the scoring platform may represent each term (or operand) as an independent probability. Thus, when term 1 is present, a probability that the document is relevant is $w_1 o_1$, or when term 2 is present the probability is $w_2 o_2$. When both terms are present, the probability that the document is relevant must be greater than either $w_1 o_1$ or $w_2 o_2$. The scoring platform may compute a probability that the document is not relevant for each of the operands, may multiply them together, may subtract that result from one, and may obtain the probability that the document is relevant, as demonstrated in the formula shown above.

The probability scoring function shown above is good for sets of terms that reinforce each other, such as terms that clarify a subject domain of the document or help to reduce ambiguity. As more terms are added to the query, a result will rise quickly before leveling off as the result approaches 1.0.

In some implementations, the scoring platform may determine a SUM score according to the following:

$$Score = \sum_{i=1}^{n} w_i o_i$$

The SUM score may be useful for combining alternative variations together. If, for example, the words "farm" and "farming" are basically equal, then their TF values may be added together and they may be treated as if they were the same term.

In some implementations, the scoring platform may determine a multiplier (MUL) score, which is a multiplication of all of the inputs and their weights:

$$Score = \prod_{i=1}^{n} w_i o_i$$

The multiplier score may be useful when combining search engine scores with document quality factors, such as date and popularity scores.

In some implementations, the scoring platform may perform vector similarity scoring. A vector similarity operator may be used when vector terms and weights are provided as a field, with both terms and weights precomputed outside of the search engine or by another operator or analyzer inside the search engine. In some implementations, an analyzer may be utilized to analyze the field, and document term weights may be stored in the index for each term. Vector weights may be determined through any of the techniques identified above for term weighting, and based on some combination of factors, such as document statistics (e.g., count, first position, dispersion, support by semantically related terms, document structural support, syntactic relation to nearby words, the output of a neural network, and/or the like), term statistics (e.g., frequency in the language, part of speech, ambiguity, and/or the like), and/or the like.

A component of vector similarity is normalization by document magnitude (e.g., a document factor, $\|D\|$). $\|D\|$ may be computed for all terms in the document or field vector (not just the terms in the query), so that a complete understanding of the indexed vector is available. For reasons of efficiency, $\|D\|$ may be computed in advance, and may be stored in the index and retrieved when needed. $\|D\|$ may be recomputed and re-stored whenever the term weights for the vector change. The vector may also be stored in the index (with all of the pre-computed vector weights) for the purposes of system stability. Alternatively, the scoring platform may normalize the vector such that $\|D\|$ is always 1.0. Note that storing and using the magnitude vector is critical for providing a truly normalized relevancy score when using vector space comparisons for providing a normalized score.

In this way, the scoring platform provides reliable scores in a predictable range, with interpretability (e.g., as probabilities), and is substantially easier for practitioners to understand and manipulate to achieve desired relevancy scoring goals. Expressions can be reliably combined without having to worry about re-weighting of individual clauses to account for token variety, field size, and/or index size. By normalizing scores that are based on estimated probabilities to be in a range from 0.0 to 1.0, the scoring platform may substantially mitigate the distributed search problem (e.g., scores across all shards, just like scores across indexes, may be equally comparable). Further, by using better proximity scoring and other query statistics, the scoring platform may completely remove IDF and similar dataset-dependent statistics from a scoring model, which improves performance, conserves resources (e.g., computing resources, networking resources, and/or the like) and ensures that the document will be retrieved with the same score regardless of the index in which it resides.

The normalized scoring provided by the scoring platform may improve accuracy when shards are organized by age. This is often the case for large indexes of news, log file, or social media data, where perhaps 90% of searches are on recent content and only 10% are on large archive content.

The scoring platform may shard such content by date range, which can improve resource utilization and conserves resources. The normalized scoring model will be more accurate in such circumstances because it will be unaffected by changes in language usage over time, which causes existing implementations to return poor results.

The scoring platform may provide a truly comparable score that allows search engines to trigger alternative search strategies (e.g., in cases where a top result is of provably low quality). Such alternative search strategies may include queries with spelling or semantic variations, searching of external datasets, requesting additional input from a user, trying more sophisticated and resource-intensive models, and/or the like. In this way, a comparable score will allow for optimization of resource expense versus quality, using more expensive search strategies only when required to obtain the needed accuracy and completeness.

In some implementations, the scoring platform may transparently communicate a quality of search results. This may provide tangible end-user benefits, such as providing information necessary for the user to make an effort-to-value based decision on whether to spend more time reviewing the results, encouraging users to rephrase a query (or search elsewhere) when results are poor, permitting users to determine if results are sufficiently accurate for automated or off-line processing (e.g., to automatically contact potential candidates for a job, or to download documents for off-line review by paralegals).

In some implementations, the scoring platform may cause a prompt to be displayed to the user identifying a low quality of search results (as may be determined, e.g., by a low score for a top result, a low mean score for a top number of results, or the like). The prompt may be accompanied by one or more suggestions of alternative queries with spelling or semantic variations, or options to expand the search to additional datasets. In some implementations, the scoring platform may automatically cause substitution of an alternative query with a higher quality of search results (as may be determined, e.g., by a relative comparison of the mean score for a top number of results generated by each query). The substitution may be indicated to the user with an option to display the results of the original query.

In some implementations, the scoring platform may enable search applications to have a normalized, comparable search engine score to accurately determine when a nested search result should be displayed, where on a page the results should be displayed (e.g., higher or lower than results from other datasets), and/or the like. The scoring platform may completely remove dependency on the IDF metric from a search engine relevancy score calculation. With IDF, scores are not comparable across datasets (e.g., a same document will score differently depending on an index in which it is stored) without difficult and expensive dataset analysis across all documents (e.g. a logistic regression analysis).

Currently there does not exist a technique that utilizes search engine relevancy ranking models to generate normalized and comparable search engine scores in the manner described herein. Finally, the process for utilizing search engine relevancy ranking models to generate normalized and comparable search engine scores conserves computing resources, networking resources, and/or the like that would otherwise be wasted in executing searches that provide unreliable search results, utilizing the unreliable search results, re-executing searches due to unreliable search results, and/or the like.

As indicated above, FIGS. 1A-1I are provided merely as examples. Other examples may differ from what is described with regard to FIGS. 1A-1I.

Figure 2:
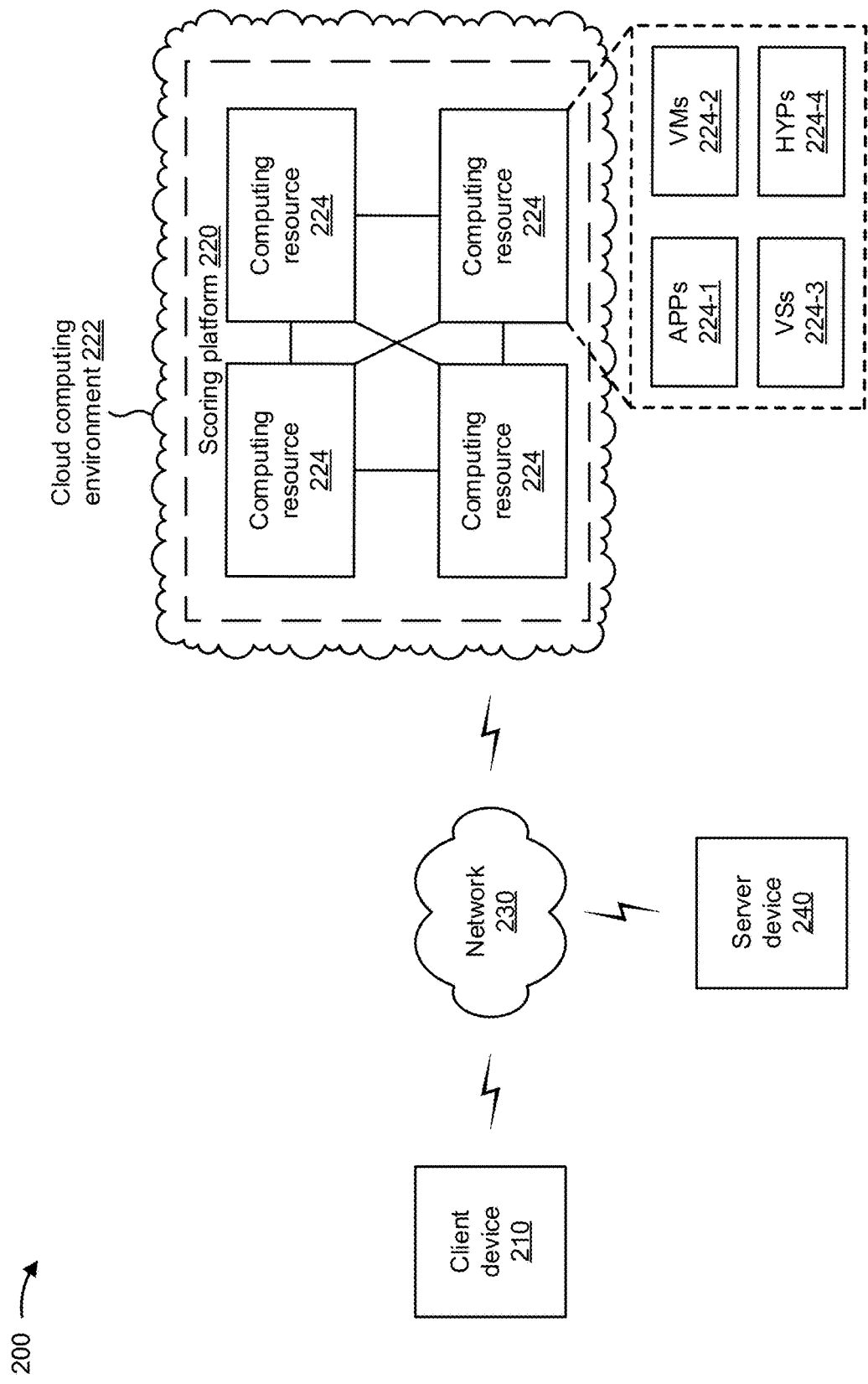
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a scoring platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to scoring platform 220 and/or server device 240.

Scoring platform 220 includes one or more devices that utilize search engine relevancy ranking models to generate normalized and comparable search engine scores. In some implementations, scoring platform 220 may be designed to be modular such that certain software components may be swapped in or out depending on a particular need. As such, scoring platform 220 may be easily and/or quickly reconfigured for different uses. In some implementations, scoring platform 220 may receive information from and/or transmit information to one or more client devices 210 and/or server devices 240.

In some implementations, as shown, scoring platform 220 may be hosted in a cloud computing environment 222. Notably, while implementations described herein describe scoring platform 220 as being hosted in cloud computing environment 222, in some implementations, scoring platform 220 may not be cloud-based (i.e., may be implemented outside of a cloud computing environment) or may be partially cloud-based.

Cloud computing environment 222 includes an environment that hosts scoring platform 220. Cloud computing environment 222 may provide computation, software, data access, storage, and/or the like, services that do not require end-user knowledge of a physical location and configuration of system(s) and/or device(s) that hosts scoring platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host scoring platform 220. The cloud resources may include compute instances executing in computing resource 224, storage devices provided in computing resource 224, data transfer devices provided by computing resource 224, and/or the like. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with scoring platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of scoring platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device. In some implementations, server device 240 may receive information from and/or transmit information to client device 210 and/or scoring platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
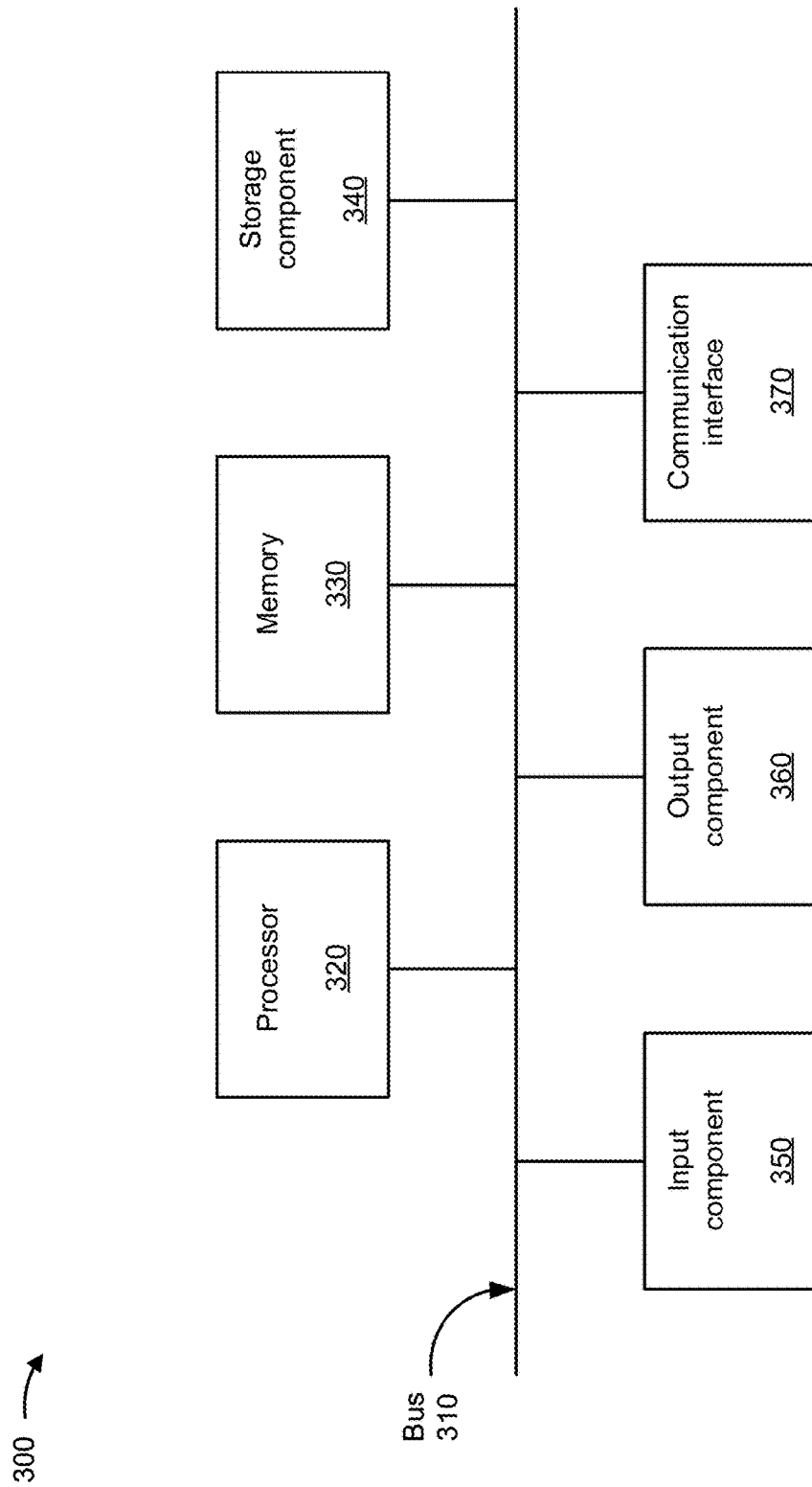
FIG. 3 is a diagram of example components of one or more devices of FIG. 2.

FIG. 3 is a diagram of example components of a device 300. Device 300 may correspond to client device 210, scoring platform 220, computing resource 224, and/or server device 240. In some implementations, client device 210, scoring platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
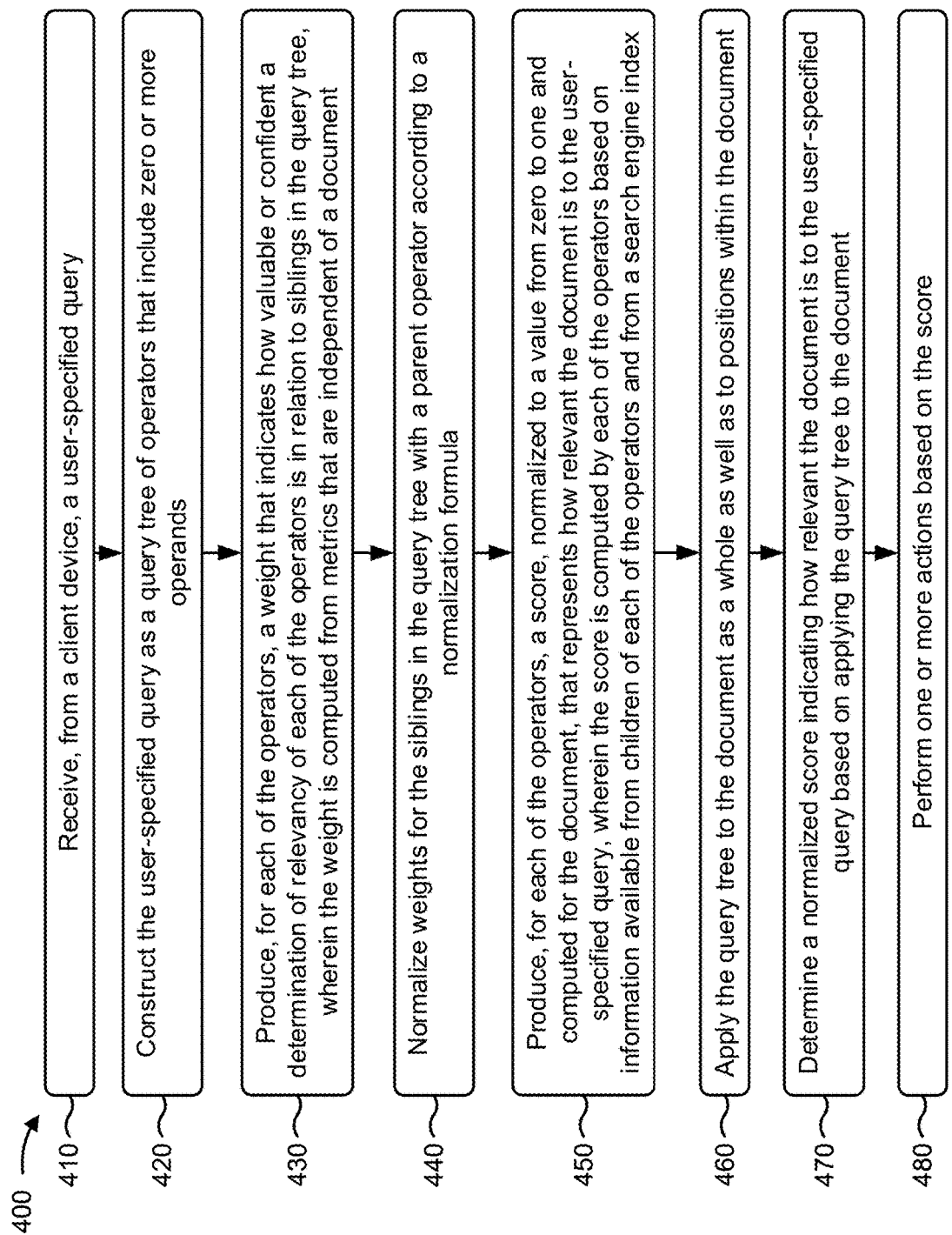
FIG. 4 is a flow chart of an example process for utilizing search engine relevancy ranking models to generate normalized and comparable search engine scores.

FIG. 4 is a flow chart of an example process 400 for utilizing search engine relevancy ranking models to generate normalized and comparable search engine scores. In some implementations, one or more process blocks of FIG. 4 may be performed by a device (e.g., scoring platform 220). In some implementations, one or more process blocks of FIG. 4 may be performed by another device or a group of devices separate from or including the device, such as a client device (e.g., client device 210), a server device (e.g., server device 240), and/or the like. Additionally, or alternatively, one or more process blocks of FIG. 4 may be performed by one or more components of device 300, such as processor 320, memory 330, storage component 340, input component 350, output component 360, communication interface 370, and/or the like.

As shown in FIG. 4, process 400 may include receiving, from a client device, a user-specified query (block 410). For example, the device may receive, from a client device, a user-specified query, as described above.

As further shown in FIG. 4, process 400 may include constructing the user-specified query as a query tree of operators that include zero or more operands (block 420). For example, the device may construct the user-specified query as a query tree of operators that include zero or more operands, as described above.

As further shown in FIG. 4, process 400 may include producing, for each of the operators, a weight that indicates how valuable or confident a determination of relevancy of each of the operators is in relation to siblings in the query tree, wherein the weight is computed from metrics that are independent of a document (block 430). For example, the device may produce, for each of the operators, a weight that indicates how valuable or confident a determination of relevancy of each of the operators is in relation to siblings in the query tree, as described above. In some implementations, the weight is computed from metrics that are independent of a document.

As further shown in FIG. 4, process 400 may include normalizing weights for the siblings in the query tree with a parent operator according to a normalization formula (block 440). For example, the device may normalize weights for the siblings in the query tree with a parent operator according to a normalization formula, as described above.

As further shown in FIG. 4, process 400 may include producing, for each of the operators, a score, normalized to a value from zero to one and computed for the document, that represents how relevant the document is to the user-specified query, wherein the score is computed by each of the operators based on information available from children of each of the operators and from a search engine index (block 450). For example, the device may produce, for each of the operators, a score, normalized to a value from zero to one and computed for the document, that represents how relevant the document is to the user-specified query, as described above. In some implementations, the score is computed by each of the operators based on information available from children of each of the operators and from a search engine index.

As further shown in FIG. 4, process 400 may include applying the query tree to the document as a whole as well as to positions within the document (block 460). For example, the device may apply the query tree to the document as a whole as well as to positions within the document, as described above.

As further shown in FIG. 4, process 400 may include determining a normalized score indicating how relevant the document is to the user-specified query based on applying the query tree to the document (block 470). For example, the device may determine a normalized score indicating how relevant the document is to the user-specified query based on applying the query tree to the document, as described above.

As further shown in FIG. 4, process 400 may include performing one or more actions based on the score (block 480). For example, the device may perform one or more actions based on the score, as described above.

Process 400 may include additional implementations, such as any single implementation or any combination of implementations described below and/or in connection with one or more other processes described elsewhere herein.

In a first implementation, performing the one or more actions includes generating a query search result based on the score and providing the query search result to the client device; providing the document and the score to the client device; or generating a summary of the document based on the score.

In a second implementation, alone or in combination with the first implementation, performing the one or more actions includes modifying the user-specified query based on the score and executing the modified user-specified query to generate another score; proposing a new query based on the score; or retraining one or more models based on the score.

In a third implementation, alone or in combination with one or more of the first and second implementations, performing the one or more actions includes generating an alternative query based on the score; determining a location of the document; recommending an alternative search mechanism based on the score; recommending more generalized query terms for the user-specified query based on the score; or generating a graphic visualization for the document.

In a fourth implementation, alone or in combination with one or more of the first through third implementations, performing the one or more actions includes retraining or selecting one or more models based on the score, where the one or more models include a sum normalization model, a Euclidean magnitude normalization model, a T-score normalization model, a Softmax normalization model, a maximum normalization model, a sigmoid normalizer model, a half-logistic function normalizer model, a log cumulative distribution model, a logistic regression normalizer model, a sigmoid model, or a half-sigmoid model.

In a fifth implementation, alone or in combination with one or more of the first through fourth implementations, the operators include an AND operator, an OR operator, a PHRASE operator, a BOOST operator, a CONSTANT operator, or a FILTER operator.

In a sixth implementation, alone or in combination with one or more of the first through fifth implementations, producing the score normalized to the value from zero to one includes utilizing a logistic regression normalization model to produce the score normalized to the value from zero to one.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device and from a client device, a user-specified query;
    constructing, by the device, the user-specified query as a query tree of operators that include zero or more operands;
    producing, by the device and for each of the operators, a weight that indicates how valuable or confident a determination of relevancy of each of the operators is in relation to siblings in the query tree,
        wherein the weight is computed from metrics that are independent of a document;
    normalizing, by the device, weights for the siblings in the query tree with a parent operator according to a normalization formula;
    producing, by the device and for each of the operators, a score, normalized to a value from zero to one and computed for the document, that represents how relevant the document is to the user-specified query,
        wherein the score is computed by each of the operators based on information available from children of each of the operators and from a search engine index;
    applying, by the device, the query tree to the document as a whole as well as to positions within the document;
    determining, by the device, a normalized score indicating how relevant the document is to the user-specified query based on applying the query tree to the document; and
    performing, by the device, one or more actions based on the score.

2. The method of claim 1, wherein performing the one or more actions comprises one or more of:
    generating a query search result based on the score and providing the query search result to the client device;
    providing the document and the score to the client device; or
    generating a summary of the document based on the score.

3. The method of claim 1, wherein performing the one or more actions comprises one or more of:
    modifying the user-specified query based on the score and executing the modified user-specified query to generate another score;
    proposing a new query based on the score; or
    retraining one or more models based on the score.

4. The method of claim 1, wherein performing the one or more actions comprises one or more of:
    generating an alternative query based on the score;
    determining a location of the document;
    recommending an alternative search mechanism based on the score;
    recommending more generalized query terms for the user-specified query based on the score; or
    generating a graphic visualization for the document.

5. The method of claim 1, wherein the normalized score is produced by a mathematical, statistical or machine learning-based model that comprises one or more of:

a weighted average normalization model,
a Euclidean magnitude normalization model,
a Softmax normalization model,
a maximum normalization model,
a sigmoid normalizer model,
a half-logistic function normalizer model,
a log cumulative distribution model,
a logistic regression normalizer model, or
a half-sigmoid normalizer model.

6. The method of claim 1, wherein the operators include one or more of:
an AND operator,
an OR operator,
a PHRASE operator,
a BOOST operator,
a CONSTANT operator, or
a FILTER operator.

7. The method of claim 6, wherein the AND operator, the OR operator, the PHRASE operator, or the FILTER operator are combined with a mathematical model, a statistical model, or a machine learning model to compute the score for documents that satisfy the AND operator, the OR operator, the PHRASE operator, or the FILTER operator.

8. A device, comprising:
one or more memories; and
one or more processors, coupled to the one or more memories and implemented at least partially in hardware, configured to:
receive, from a client device, a user-specified query;
construct the user-specified query as a query tree of operators that include zero or more operands;
produce, for each of the operators, a weight that indicates how valuable or confident a determination of relevancy of each of the operators is in relation to siblings in the query tree,
wherein the weight is computed from metrics that are independent of a document;
normalize weights for the siblings in the query tree with a parent operator according to a normalization formula;
produce, for each of the operators, a score, normalized to a value from zero to one and computed for the document, that represents how relevant the document is to the user-specified query,
wherein the score is computed by each of the operators based on information available from children of each of the operators and from a search engine index;
apply the query tree to the document as a whole as well as to positions within the document;
determine a normalized score indicating how relevant the document is to the user-specified query based on applying the query tree to the document; and
perform one or more actions based on the score.

9. The device of claim 8, wherein the one or more processors, to perform the one or more actions, are configured to:
generate a query search result based on the score and providing the query search result to the client device;
provide the document and the score to the client device; or
generate a summary of the document based on the score.

10. The device of claim 8, wherein the one or more processors, to perform the one or more actions, are configured to:
modify the user-specified query based on the score and executing the modified user-specified query to generate another score;
propose a new query based on the score; or
retrain one or more models based on the score.

11. The device of claim 8, wherein the one or more processors, to perform the one or more actions, are configured to:
generate an alternative query based on the score;
determine a location of the document;
recommend an alternative search mechanism based on the score;
recommend more generalized query terms for the user-specified query based on the score; or
generate a graphic visualization for the document.

12. The device of claim 8, wherein the normalized score is produced by a mathematical, statistical, or machine learning-based model that comprises one or more of:
a weighted average normalization model,
a Euclidean magnitude normalization model,
a Softmax normalization model,
a maximum normalization model,
a sigmoid normalizer model,
a half-logistic function normalizer model,
a log cumulative distribution model,
a logistic regression normalizer model, or
a half-sigmoid normalizer model.

13. The device of claim 8, wherein the operators include one or more of:
an AND operator,
an OR operator,
a PHRASE operator,
a BOOST operator,
a CONSTANT operator, or
a FILTER operator.

14. The device of claim 13, wherein the AND operator, the OR operator, the PHRASE operator, or the FILTER operator are combined with a mathematical model, a statistical model, or a machine learning model to compute the score for documents that satisfy the AND operator, the OR operator, the PHRASE operator, or the FILTER operator.

15. A non-transitory computer-readable medium storing a set of instructions, the set of instructions comprising:
one or more instructions that, when executed by one or more processors of a device, cause the device to:
receive, from a client device, a user-specified query;
construct the user-specified query as a query tree of operators that include zero or more operands;
produce, for each of the operators, a weight that indicates how valuable or confident a determination of relevancy of each of the operators is in relation to siblings in the query tree,
wherein the weight is computed from metrics that are independent of a document;
normalize weights for the siblings in the query tree with a parent operator according to a normalization formula;
produce, for each of the operators, a score, normalized to a value from zero to one and computed for the document, that represents how relevant the document is to the user-specified query,
wherein the score is computed by each of the operators based on information available from children of each of the operators and from a search engine index;
apply the query tree to the document as a whole as well as to positions within the document;

determine a normalized score indicating how relevant the document is to the user-specified query based on applying the query tree to the document; and perform one or more actions based on the score.

16. The non-transitory computer-readable medium of claim 15, wherein the one or more instructions, that cause the device to perform the one or more actions, cause the device to:
generate a query search result based on the score and providing the query search result to the client device;
provide the document and the score to the client device; or
generate a summary of the document based on the score.

17. The non-transitory computer-readable medium of claim 15, wherein the one or more instructions, that cause the device to perform the one or more actions, cause the device to:
modify the user-specified query based on the score and executing the modified user-specified query to generate another score;
propose a new query based on the score; or
retrain one or more models based on the score.

18. The non-transitory computer-readable medium of claim 15, wherein the one or more instructions, that cause the device to perform the one or more actions, cause the device to:
generate an alternative query based on the score;
determine a location of the document;
recommend an alternative search mechanism based on the score;
recommend more generalized query terms for the user-specified query based on the score; or
generate a graphic visualization for the document.

19. The non-transitory computer-readable medium of claim 15, wherein the normalized score is produced by a mathematical, statistical or machine learning-based model that comprises one or more of:
a weighted average normalization model,
a Euclidean magnitude normalization model,
a Softmax normalization model,
a maximum normalization model,
a sigmoid normalizer model,
a half-logistic function normalizer model,
a log cumulative distribution model,
a logistic regression normalizer model, or
a half-sigmoid normalizer model.

20. The non-transitory computer-readable medium of claim 15, wherein the operators include one or more of:
an AND operator,
an OR operator,
a PHRASE operator,
a BOOST operator,
a CONSTANT operator, or
a FILTER operator.

* * * * *